United States Patent [19]

Liu

[11] Patent Number: 5,764,798

[45] Date of Patent: Jun. 9, 1998

[54] PRIORITIZED SEARCHING METHODS FOR FINDING A CODED SYMBOL IN A DIGITIZED IMAGE

[75] Inventor: Lingnan Liu, Mill Creek, Wash.

[73] Assignee: Intermec Corporation, Everett, Wash.

[21] Appl. No.: 617,026

[22] Filed: Mar. 18, 1996

[51] Int. Cl.$^6$ .................................................. G06K 9/00
[52] U.S. Cl. ............................................ 382/190; 382/312
[58] Field of Search .................................. 382/101, 102, 382/113, 135, 137, 138, 139, 140, 181, 183, 184, 190, 191, 192, 193, 195, 199, 203, 318, 319, 173, 286, 186, 187, 194, 201, 202, 204, 205, 209, 224, 312, 321; 235/462; 377/10

[56] References Cited

U.S. PATENT DOCUMENTS

| | | | |
|---|---|---|---|
| 4,183,013 | 1/1980 | Agrawala et al. | 340/146.3 AC |
| 4,728,784 | 3/1988 | Stewart | 235/462 |
| 4,916,297 | 4/1990 | Tukada et al. | 235/462 |
| 4,973,829 | 11/1990 | Ishida et al. | 235/462 |
| 5,129,012 | 7/1992 | Abe | 382/16 |
| 5,295,196 | 3/1994 | Raterman et al. | 382/7 |
| 5,296,691 | 3/1994 | Waldron et al. | 235/462 |
| 5,343,028 | 8/1994 | Figarella et al. | 235/462 |
| 5,367,578 | 11/1994 | Golem et al. | 382/12 |
| 5,374,999 | 12/1994 | Chuang et al. | 382/135 |
| 5,378,881 | 1/1995 | Adachi | 235/462 |
| 5,386,482 | 1/1995 | Basso et al. | 382/9 |
| 5,387,787 | 2/1995 | Waldron et al. | 235/462 |
| 5,438,188 | 8/1995 | Surka | 235/462 |
| 5,444,231 | 8/1995 | Shellhammer et al. | 235/462 |
| 5,457,308 | 10/1995 | Spitz et al. | 235/462 |
| 5,478,999 | 12/1995 | Figarella et al. | 235/462 |
| 5,489,769 | 2/1996 | Kubo | 235/462 |
| 5,504,322 | 4/1996 | Pavlidis et al. | 235/494 |
| 5,545,887 | 8/1996 | Smith et al. | 235/462 |
| 5,550,365 | 8/1996 | Klancnik et al. | 235/462 |

*Primary Examiner*—Leo Boudreau
*Assistant Examiner*—Bijan Tadayon
*Attorney, Agent, or Firm*—Graham & James LLP

[57] ABSTRACT

An electro-optical imaging system that utilizes an efficient search algorithm to find a coded symbol within a digitized image is provided. A digitized image of an area of an object having a coded symbol attached or printed thereon is created and stored in an image memory. A search algorithm is then activated to search for the coded symbol within the digitized image stored in the image memory. The search is limited to an area of the digitized image that is defined by boundary parameters. The search begins with the scan of an initial horizontal line of pixels that passes through the center of the search area, and an initial vertical line of pixels that also passes through the center of the search area. Subsequent horizontal and vertical lines of pixels are then scanned, one each subsequent line is located an integer multiple number of step sizes from one of the initial lines. Once the above described search pattern expands beyond the boundaries of the search area, the step sizes are reduced, and the search is continued.

29 Claims, 25 Drawing Sheets

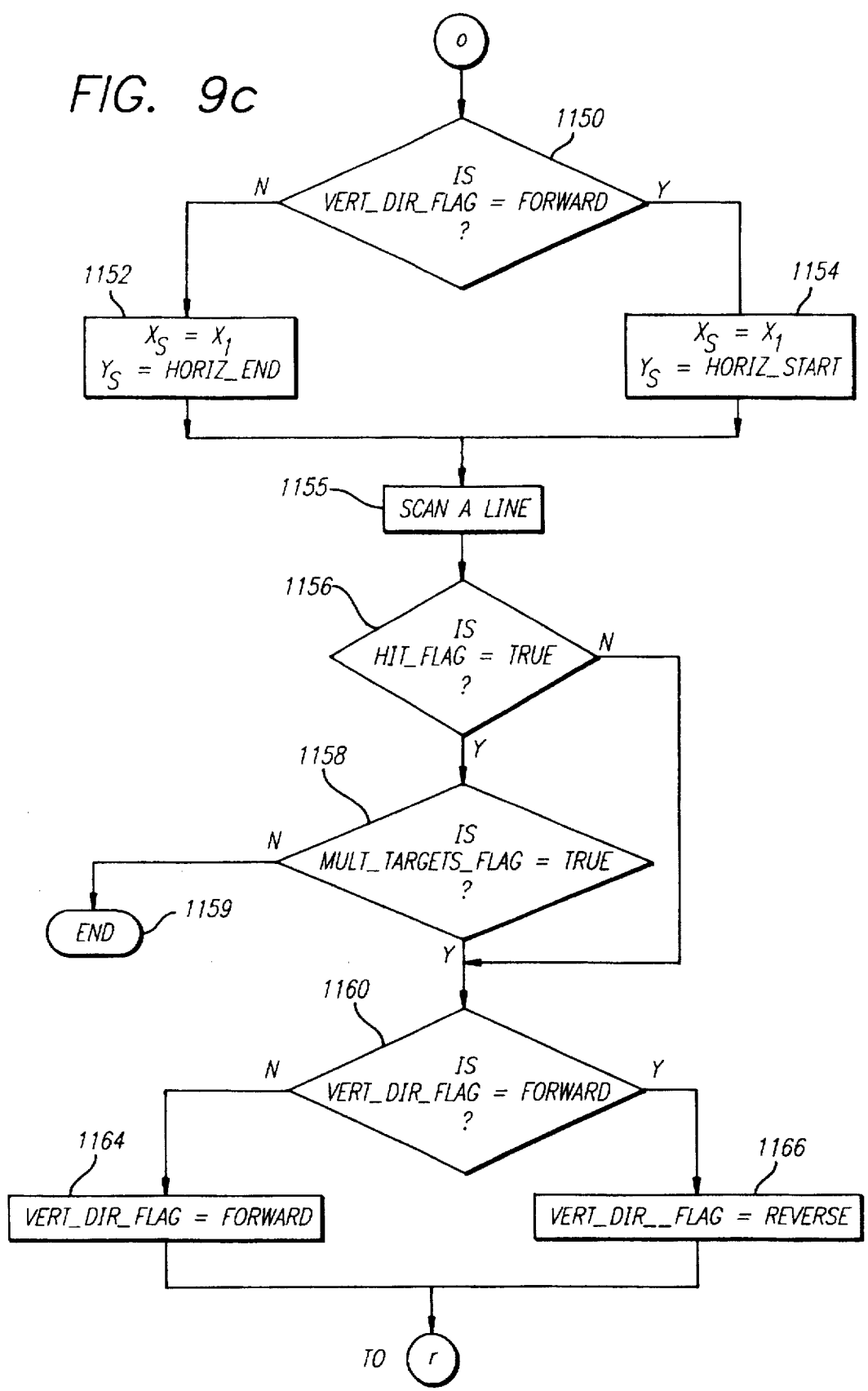

PRIORITIZED SEARCHING METHODS FOR FINDING A CODED SYMBOL IN A DIGITIZED IMAGE

BACKGROUND OF THE INVENTION

1. Field of the Invention

The present invention relates to a process, apparatus, and article of manufacture for searching for a coded symbol within a digitized image.

2. Description of Related Art

It is common within the data collection industry to encode information about an object into a coded symbol, print the coded symbol on a label, and attach the label to the object. Alternatively, the coded symbol can be printed directly onto the object. An electro-optical imaging system can then be used to read the coded symbol and translate it back into the original information. Systems of this nature are commonly used in various applications, such as inventory control, point-of-sale identification, or logistical tracking systems.

It is also common to encode information about a person into a coded symbol, and print or attach the coded symbol to an identification card or the like. Systems of this nature are commonly used in applications such as security systems.

The term "symbology" refers to a set of rules that define the manner in which information is encoded into a coded symbol. More specifically, a symbology typically defines a set of "code words" each of which represents one piece of information in the information set to be encoded, and each code word is defined as a particular arrangement of pattern elements. Typically, the information to be encoded consists of alpha-numeric characters, and each code word represents one alpha-numeric character. The information to be encoded may, however, comprise other types of symbols such as graphical symbols.

Traditionally, the automatic data collection industry has used only one-dimensional symbologies. In a one-dimensional symbology, each code word consists of a one-dimensional arrangement of pattern elements, and a coded symbol consists of a one-dimensional arrangement of code words. A bar code is a well known example of a one-dimensional symbology. Each code word in a bar code symbology consists of a one-dimensional arrangement of parallel bars and spaces. Numerous well known one-dimensional symbologies exist, including Codabar, Code 39, and Code 93. FIGS. 11a-c show exemplary coded symbols created using those respective symbologies.

Recently, the automatic data collection industry has begun using two-dimensional symbologies. In a two-dimensional symbology, a coded symbol may consist of a two-dimensional arrangement of code words, and each code word may be defined by a two-dimensional arrangement of pattern elements. A two-dimensional symbology is generally capable of representing more information than a one-dimensional symbology. Numerous well-known two-dimensional symbologies exist, including Codablock, PDF417, Code One, Maxicode, Vericode and Data Matrix. FIGS. 11d-i show exemplary two-dimensional coded symbols created using those respective symbologies. The term "coded symbol" as used herein includes symbols encoded using a one-dimensional symbology and symbols encoded using a two-dimensional symbology.

An electro-optical imaging system reads a coded symbol printed on or attached to an object by directing light onto the coded symbol and then detecting light that reflects off of the coded symbol. Because darker colored pattern elements in the coded symbol reflect light differently than lighter colored pattern elements, the reflected light can be converted into electrical signals that represent the coded symbol.

A typical electro-optical imaging system utilizes a charge coupled device (CCD) to convert reflected light into a digitized image of a coded symbol. In such a system, light reflected off of a coded symbol is directed onto a multidimensional array of adjacent photo-diodes that comprise the CCD device. Each individual photo-diode converts the reflected light into an electrical signal that represents the intensity of the light reflected onto that particular photo-diode. A digitized image of the coded symbol can then be obtained by sequentially scanning the individual photo-diodes.

Because it usually cannot be known precisely where on an object a coded symbol has been attached or printed, an electro-optical imaging system must illuminate an area of the object that is larger than the coded symbol. The electro-optical imaging system must then search the resulting digitized image of the illuminated area to find the coded symbol. Conventional algorithms for locating a coded symbol within a digitized image scan every line of the digitized image either horizontally from top to bottom or vertically from left to right.

Sequentially scanning every line of a digitized image, however, is inefficient, wastes time and computing power, and may require an excessive amount of time to complete the search. Accordingly, there is a critical need for an efficient search method and apparatus to search for a coded symbol within a digitized image. Ideally, such a method and apparatus should be independent of the type of symbology used to encode the coded symbol.

SUMMARY OF THE INVENTION

In accordance with the teachings of the present invention, an electro-optical imaging system utilizes an efficient search algorithm to locate a coded symbol within a digitized image.

The imaging system of the present invention includes an imaging element, an image memory, a microprocessor, and a program memory. The imaging element creates a digitized image of an area of an object having a coded symbol attached or printed therein, and stores the digitized image in the image memory. Under control of program code stored in the program memory, the microprocessor searches for the coded symbol within the digitized image. The search is limited to a predetermined area of the digitized image.

The search begins with the scan of an initial horizontal line of pixels that passes through the center of the search area and an initial vertical line of pixels that also passes through the center of the search area. The search then expands across the search area by alternatively scanning subsequent pairs of horizontal lines and pairs of vertical lines. Each subsequent pair of horizontal lines is located an increasing integer number of step sizes above and below the initial horizontal line, and each subsequent pair of vertical lines is similarly located an increasing integer number of step sizes to the right and left of the initial vertical line.

Once the search expands beyond the predetermined search area, the step size is reduced, and the above search pattern is repeated, producing a second iteration of the search pattern. Further iterations are repeated with increasingly smaller step sizes until either the coded symbol is found or the step size becomes smaller than a predefined minimum step size. Because the searching methods of the present invention initially generate a coarse search pattern that covers the entire predetermined search area, and then repeatedly generate increasingly finer iterations of the search pattern, the searching methods of the present invention are more efficient than prior art searching techniques.

A more complete understanding of the method, apparatus, and article of manufacture for efficiently searching for a coded symbol within a digitized image will be afforded to those skilled in the art, as well as a realization of additional advantages and objects thereof, by consideration of the following detailed description of the preferred embodiment. Reference will be made to the appended sheets of drawings which will first be described briefly.

BRIEF DESCRIPTION OF THE DRAWINGS

FIGS. 9a–9e illustrate the operation of a second alternative embodiment of the symbol locator block;

DETAILED DESCRIPTION OF THE PREFERRED EMBODIMENT

1. Overview

The present invention satisfies the critical need for an electro-optical imaging system that utilizes an efficient algorithm to search for a coded symbol within a digitized image. Moreover, the algorithm is independent of the particular type of symbology used to encode the coded symbol. In the detailed description that follows, like element numerals are used to describe like elements in one or more figures.

Figure 1:
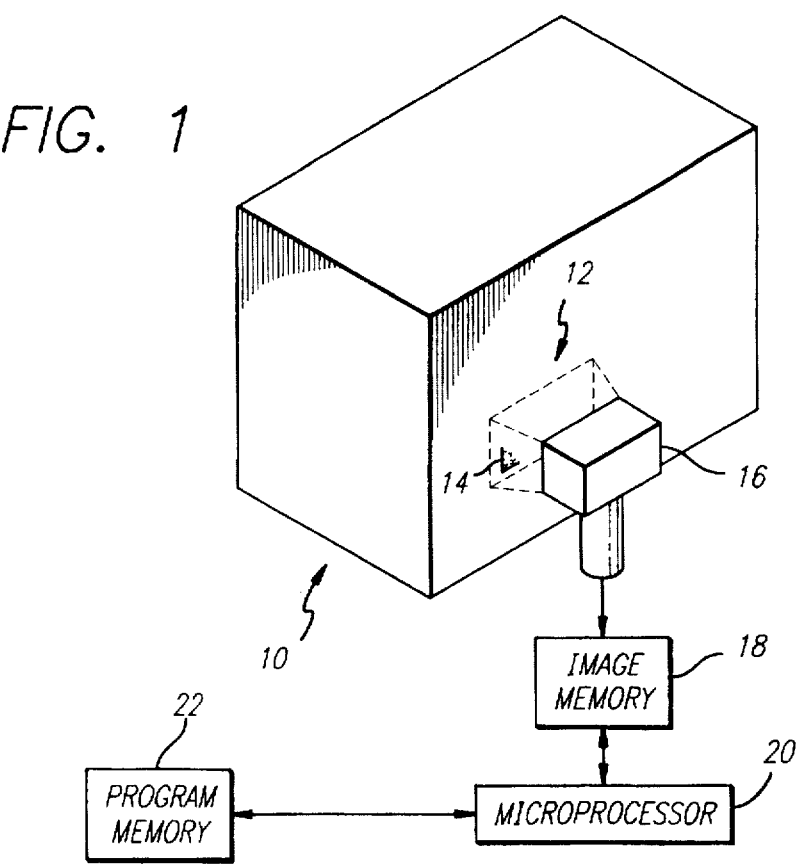
FIG. 1 is an illustration of an electro-optical imaging system.

Referring first to FIG. 1, an electro-optical imaging system that includes the teachings of the present invention is illustrated. The imaging system includes an imaging element 16, an image memory 18, a microprocessor 20, and a program memory 22. The imaging element is comprised of an array of photo-diodes, each of which converts light into an electrical signal, which in turn is converted into digital data representing the intensity of the light directed onto the particular photo-diode.

The microprocessor 20 controls operation of the imaging system in accordance with an instruction set, e.g., software or firmware, stored in a program memory 22. Any conventional microprocessor may be used with the present invention, such as the TI-C30 processor available from Texas Instruments, Inc. The program memory 22 can be provided by conventional semiconductor-based read only memory (ROM) devices. Such ROM devices are non-volatile and permit the stored instructions to remain in storage within the devices even after electrical power is removed.

It should be apparent that the functions performed by the stored instruction set may also be accomplished by traditional hard wired circuits, but software or firmware systems are preferred due to their relative simplicity, adaptability to change, and low cost. It should also be apparent that the ROM devices may further be erasable or programmable, so that modifications or revisions to the software can be implemented as desired. Moreover, other permanent storage media can be utilized as program memory 22, such as magnetic or optical disks.

The digital data produced by each photo-diode of the imaging element 16 is stored in a corresponding memory cell of an image memory 18. The image memory 18 can comprise a semiconductor-based random access memory (RAM), such as a conventional dynamic RAM (DRAM) device.

The entire imaging system, including the imaging element 16, the imaging memory 18, the microprocessor 20, and the program memory 22 may be contained within a single unit. Alternatively, the elements may be distributed, such as with the imaging element 16 disposed in a remote device and the other elements disposed in a central unit. This way, a simple, lightweight unit can be used to create image data and transmit the data to a central unit for further processing. The image data may then be transmitted to an attached computer, stored locally for later transfer, or forwarded to an application program resident within the imaging system itself.

Figure 2:
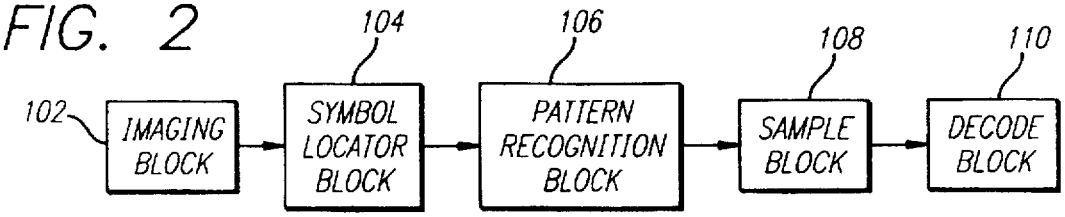
FIG. 2 is a block diagram illustrating the operation of the electro-optical imaging system of the present invention.

Referring next to FIG. 2, a block diagram illustrating operation of the electro-optical imaging system is provided. The operation of the electro-optical imaging system begins with an imaging block 102, which creates a digitized image of an illuminated area 12 of an object 10 and stores the digitized image in the image memory 18. More particularly, a light source (not shown) illuminates an area 12 of the object 10. The illuminated area 12 includes at least one coded symbol 14 that has been printed on or attached to the object 10. Light from the light source (not shown) reflects off of the area 12 and impinges on the surface of the imaging element 16.

The surface of the imaging element 16 comprises a two-dimensional array of adjacent photo-diodes. It should be noted that the array is not limited to any particular pattern. For example, the array can be arranged in the usual order of linear rows and columns; the array can be arranged in a diamond pattern in which the rows are linear and the columns are offset in a regular fashion; or the array can be arranged in any other pattern in which the photo-diodes are ordered relative to each other. Each photo-diode generates an electric signal that corresponds to the amount of light reflected onto that photo-diode. The electric signal generated by each photo-diode is converted into a binary value, which represents a gray scale value of a corresponding area of the illuminated area 12. Binary data from each of the photo-diodes is stored in a corresponding cell of the image memory 18, forming a digitized image 320 of the illuminated area 12.

Figure 3:
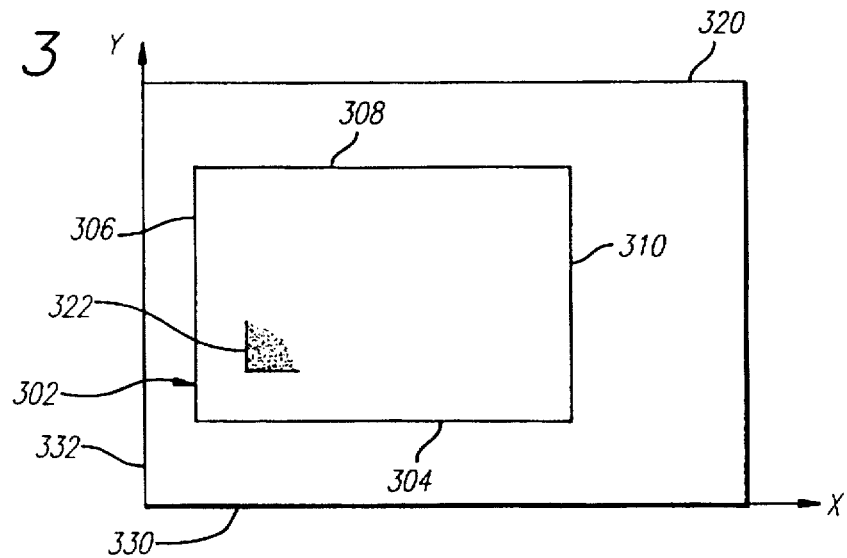
FIG. 3 shows a digitized image stored in the image memory.
Figure 4A:
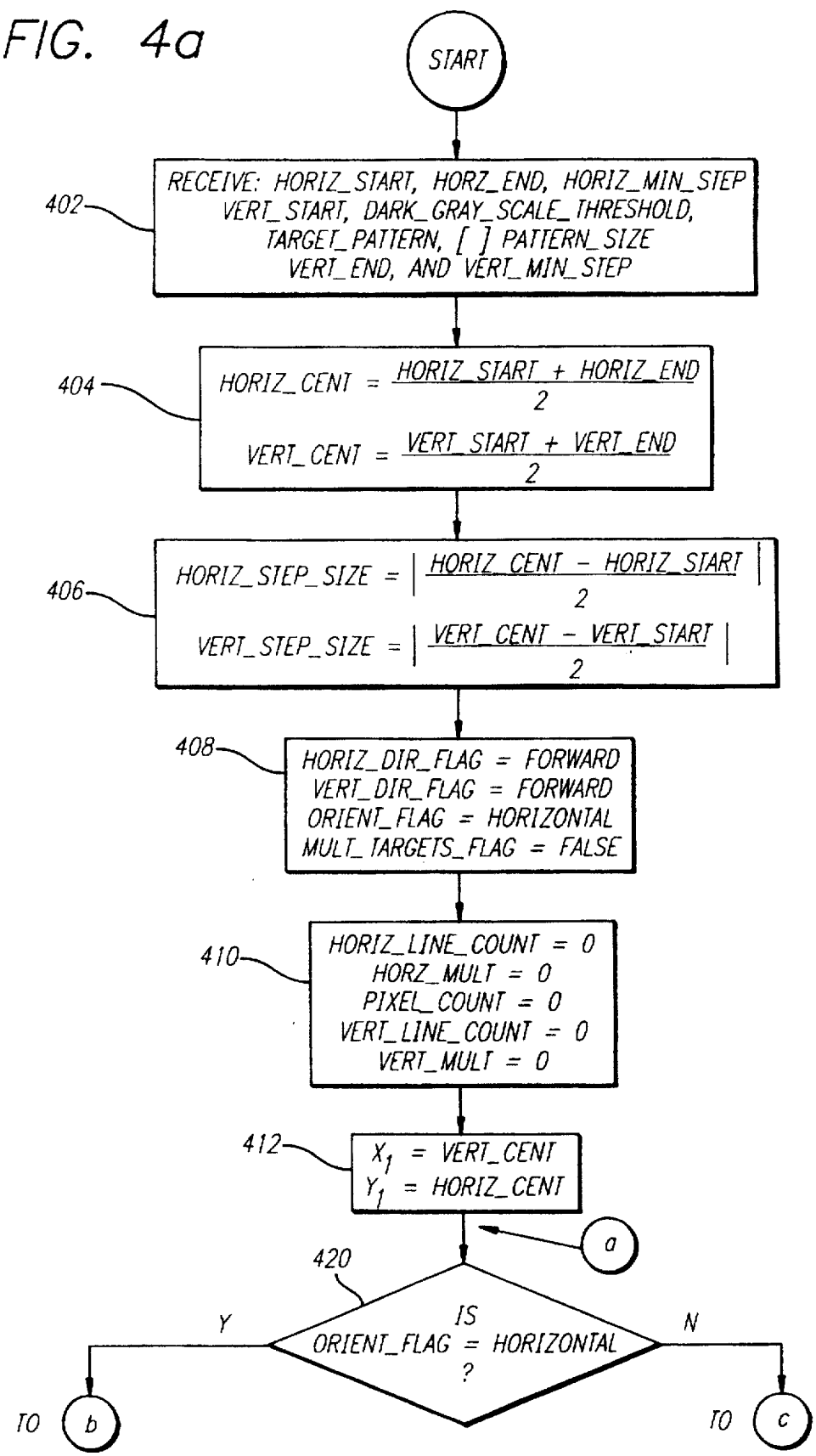
FIGS. 4a–4e illustrate the operation of a preferred embodiment of the symbol locator block.
Figure 4B:
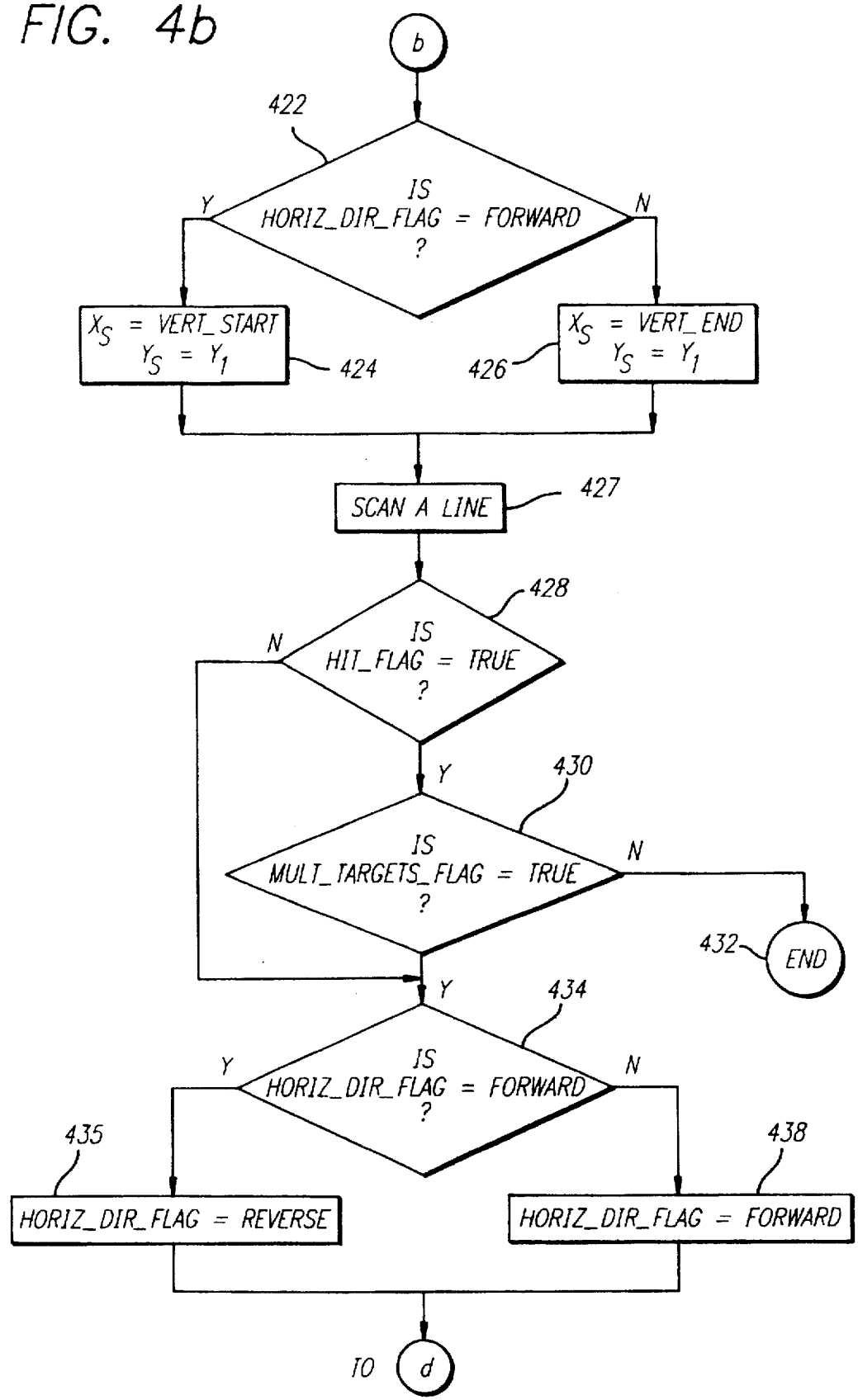
Figure 4C:
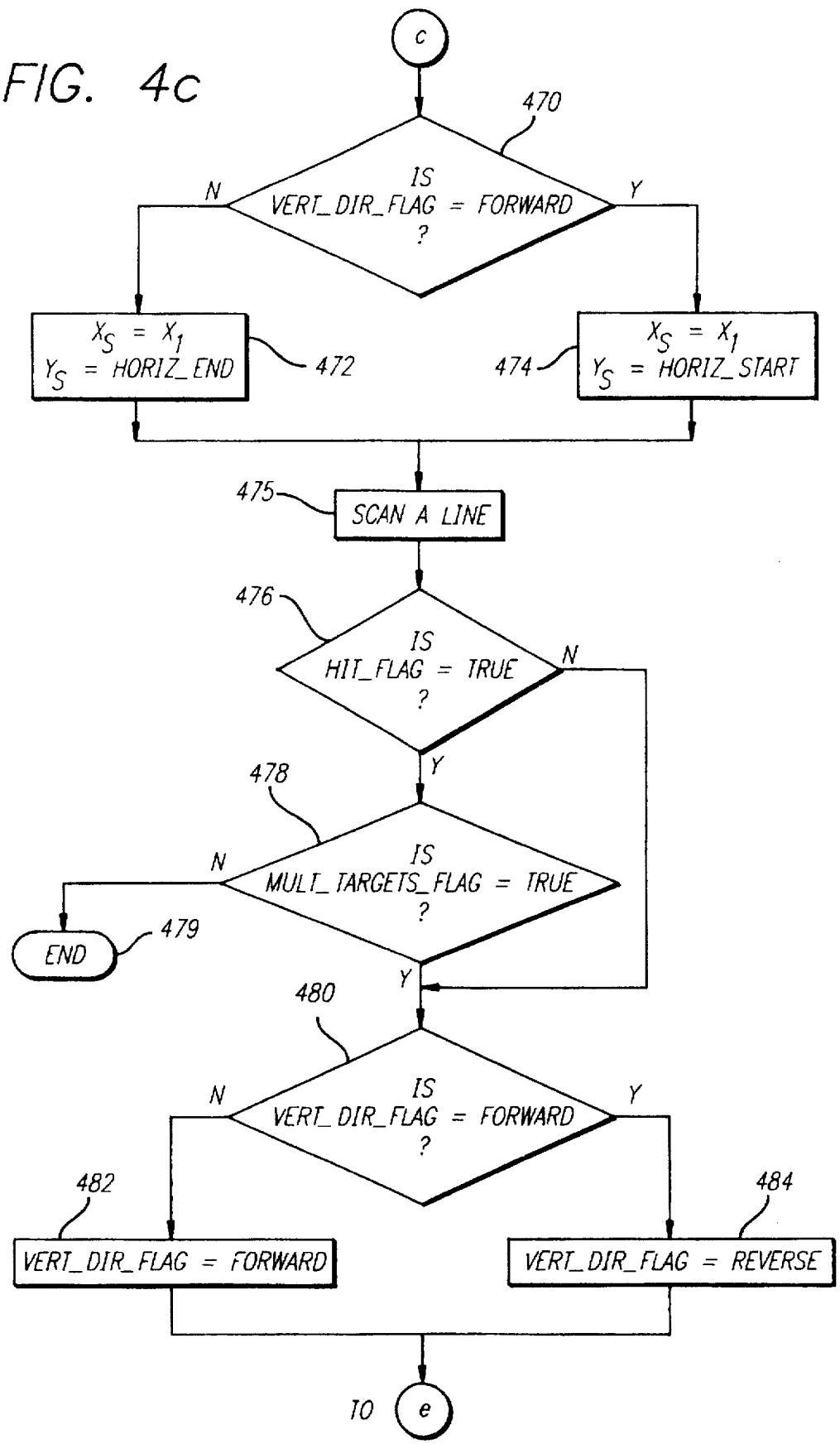
Figure 4D:
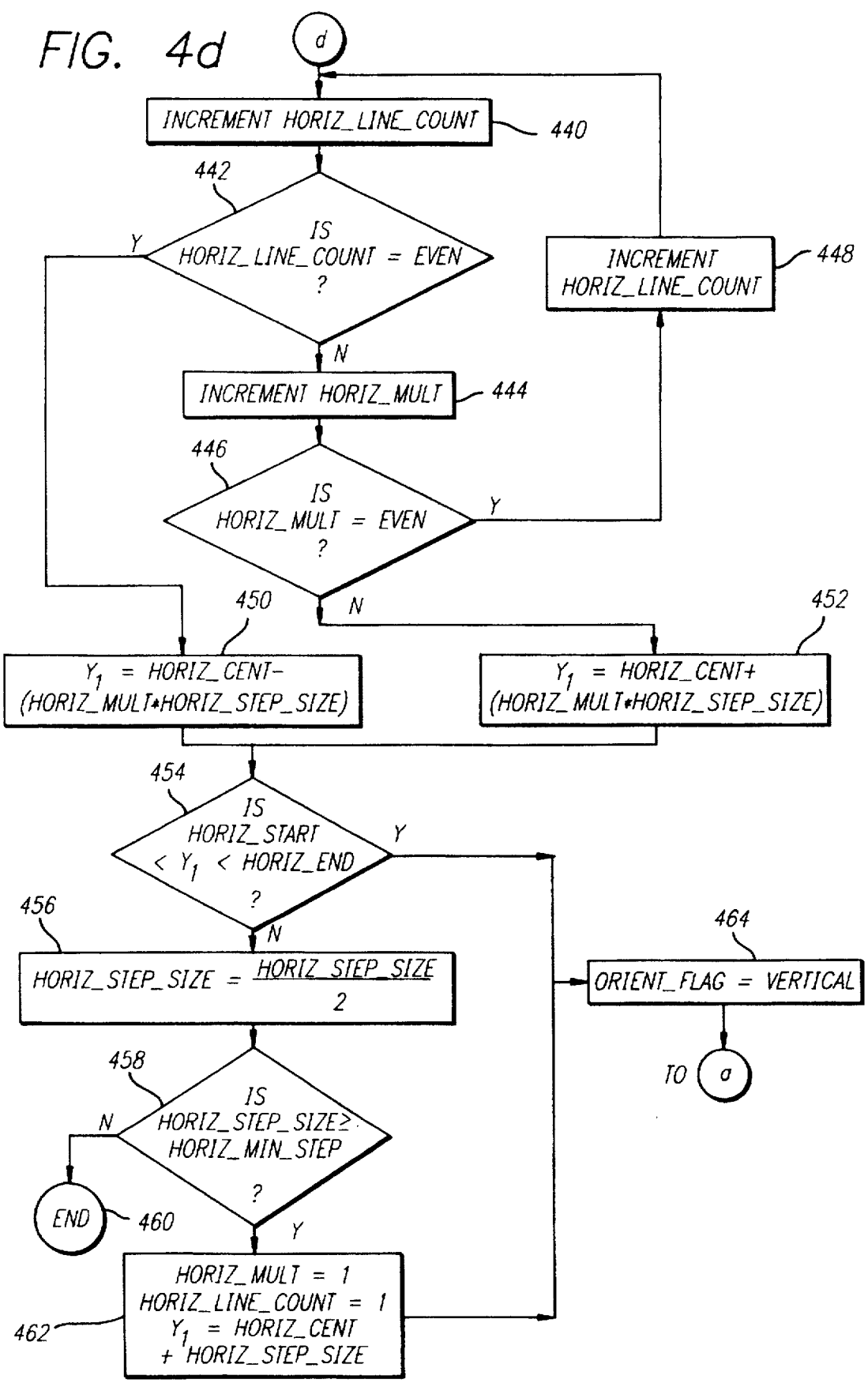
Figure 4E:
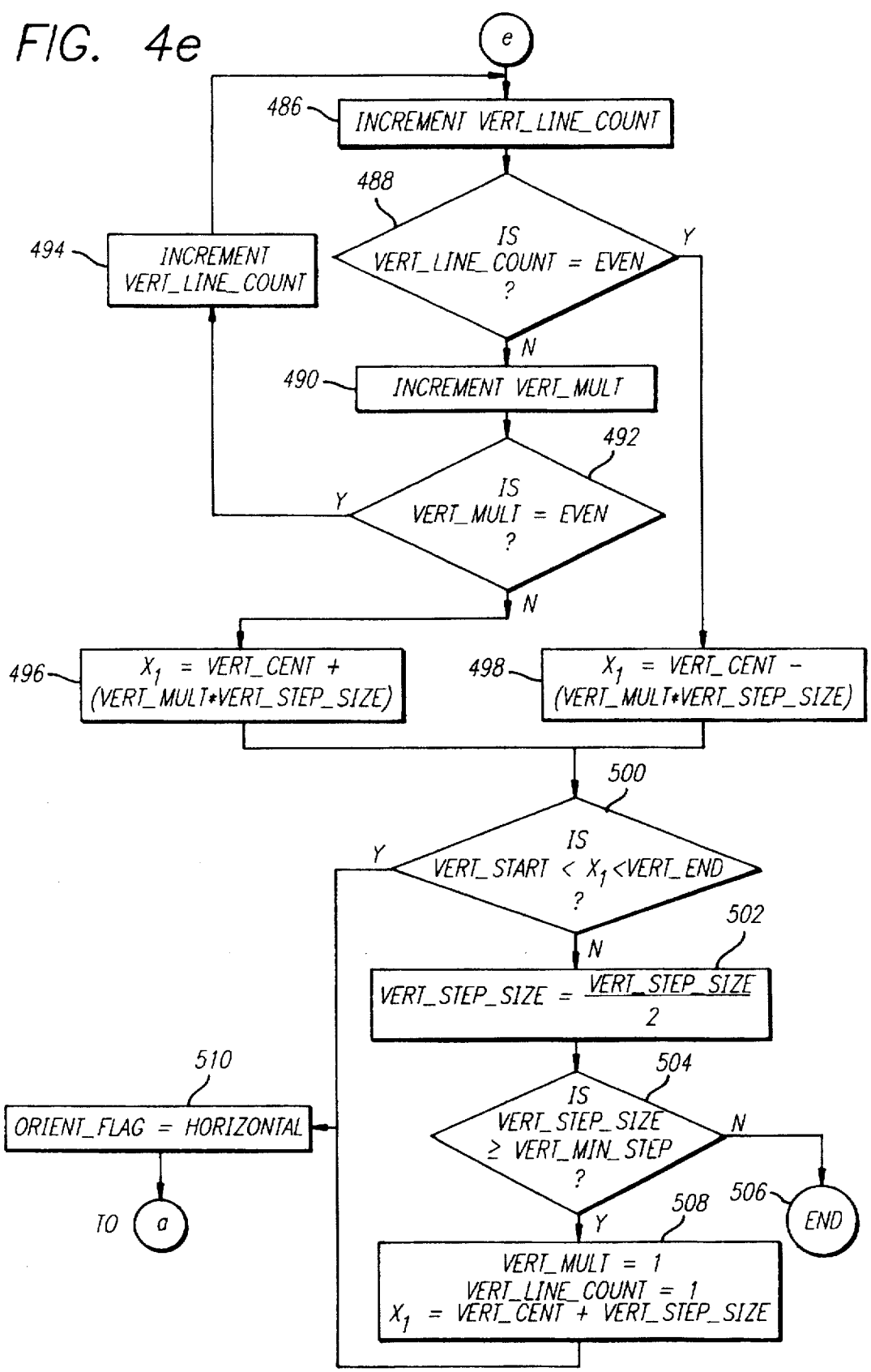

Referring next to FIG. 3, an exemplary digitized image 320 of the illuminated area 12 is shown. The digitized image is comprised of a two-dimensional array of binary data values, each representing one pixel in the image. The location of each pixel is preferably defined by a point on a two-dimensional grid having a horizontal (X) axis 330 and a vertical (Y) axis 332.

After the digitized image 320 has been stored in the image memory 18, a symbol locator block 104 searches the digitized image for the coded symbol 322. After the coded symbol has been found, a pattern recognition block 106 determines the specific type of symbology that was used to code the coded symbol. Numerous one-dimensional and two-dimensional symbologies are well known, including the exemplary one-dimensional symbologies illustrated in FIGS. 10a–10c, and the two-dimensional symbologies illustrated in FIGS. 11d–11i.

After the pattern recognition block 106 has determined the specific type of symbology used to code the coded symbol 14, the sample block 108 and the decode block 110 are activated. The sample block 108 reads individual code words from the coded symbol and passes the code words to the decode block 110. Utilizing the symbology identified by the pattern recognition block 106, the decode block 110 decodes the individual code words.

2. Preferred Embodiment of the Symbol Locator Block

Operation of a preferred embodiment of the symbol locator block 104 will now be described with reference to FIGS. 4a–4e. Operation of the preferred embodiment begins with an initialization process. More particularly, parameters defining a search area 302 of the digitized image 320 are received at step 402. As illustrated in FIG. 3, the search area 302 is preferably rectangular and defined by a horizontal start boundary 304, a horizontal end boundary 308, a vertical start boundary 306, and a vertical end boundary 310. The horizontal start boundary 304 is preferably defined by a Y-axis value (HORIZ_START), and the horizontal end boundary 308 is preferably defined by another Y-axis value (HORIZ_END). Likewise, the vertical start boundary 306 and the vertical end boundary 310 are preferably defined by two X-axis values, respectively (VERT_START and VERT_END).

A target pixel pattern stored in a target pattern array (TARGET_PATTERN[0:PATTERN_SIZE]) is also received at step 402. The target pattern array may be a single-dimensional array, and the number of pixels in the pattern may be defined by a pattern size parameter (PATTERN_SIZE) also received at step 402. The target pixel pattern is characteristic of the type of symbol being searched for, and as the symbol locator block 104 scans lines of pixels stored in the image memory 18, it looks for a sequence of pixels that matches the target pixel pattern.

The target pixel pattern may be any pattern that is characteristic of the coded symbol being searched for. For example, all of the coded symbols illustrated in FIGS. 11a–11i include at least one dark colored bar or line that has a minimum thickness. The target pixel pattern for any of those coded symbols could comprise a series of sequential "dark" pixels in which the number of pixels in the series corresponds to the minimum thickness of a dark colored bar or line. A dark gray scale threshold parameter (DARK_GRAY_SCALE_THRESHOLD) may also be received at step 402 defining a threshold gray scale value that distinguishes a "dark" pixel from a "light" pixel.

A minimum horizontal step size (HORIZ_MIN_STEP) and a minimum vertical step size (VERT_MIN_STEP) are also received at step 402. As will become apparent, the minimum horizontal step size (HORIZ_MIN_STEP) and the minimum vertical step size (VERT_MIN_STEP) define the fineness of the final iteration of the search pattern generated by the symbol locator block 104. To ensure that a coded symbol located within the search area is not missed, both minimum step sizes should be smaller than the target pixel pattern.

An initial horizontal line value (HORIZ_CENT) and an initial vertical line value (VERT_CENT) are calculated at step 404. The initial horizontal line value (HORIZ_CENT) is preferably a Y-axis value that defines a horizontal line passing through the center of the search area. Likewise, the initial vertical line value (VERT_CENT) is preferably an X-axis value that defines a vertical line passing through the center of the search area.

A horizontal step size (HORIZ_STEP_SIZE) and a vertical step size (VERT_STEP_SIZE) are calculated at step 406. As will become apparent, the horizontal step size and the vertical step size define the coarseness of each iteration of the search pattern generated by the symbol locator block 104. For example, the initial value of the horizontal step size may be equal to one-fourth the length of a vertical boundary of the search area 306, 310. Likewise, the initial value of the vertical step size may be equal to one-fourth the length of a horizontal boundary of the search area 304, 308.

A multiple targets flag (MULT_TARGETS_FLAG) is set equal to "false" at step 408, indicating that only one symbol is to be searched for within the search area. Also, an orientation flag (ORIENT_FLAG) is set to "horizontal" at step 408, indicating that the search for the coded symbol will begin with the scan of a horizontal line of pixels stored in the image memory 18. In addition, a horizontal direction flag (HORIZ_DIR_FLAG) is set equal to "forward" at step 408, indicating that the initial horizontal line of pixels will be scanned in the forward direction. Likewise, a vertical direction flag (VERT_DIR_FLAG) is set equal to "forward" at step 408, indicating that the initial vertical line of pixels will be scanned in the forward direction. The forward direction is away from a start boundary and toward an end boundary. The reverse direction is away from an end boundary and toward a start boundary.

The next horizontal line value ($Y_1$) and the next vertical line value ($X_1$) are initialized at step 412. The next horizontal line value ($Y_1$) defines a location along the Y-axis through which the next horizontal line of pixels to be scanned passes. Likewise, the next vertical line value ($X_1$) defines a location along the X-axis through which the next vertical line of pixels to be scanned passes. Preferably, the next horizontal line value ($Y_1$) is initially set equal to the initial horizontal line value (HORIZ_CENT), and the next vertical line value ($X_1$) is initially set equal to the initial vertical line value (VERT_CENT).

A horizontal multiplier (HORIZ_MULT) and a vertical multiplier (VERT_MULT) are initialized at step 410. As will be seen, the horizontal multiplier is utilized to move the next horizontal line value ($Y_1$) away from the initial horizontal line value (HORIZ_CENT) after scanning a horizontal line of pixels. Likewise, the vertical multiplier is utilized to move the next vertical line value ($X_1$) away from the initial vertical line value (VERT_CENT) after scanning a vertical line of pixels.

A horizontal line counter (HORIZ_LINE_COUNT) and a vertical line counter (VERT_LINE_COUNT) are initialized at step 410. As will be seen, the horizontal line counter (HORIZ_LINE_COUNT) is incremented each time the next horizontal line value ($Y_1$) is changed, and the vertical line counter (VERT_LINE_COUNT) is incremented each time the next vertical line value ($X_1$) is changed. As will also be seen, the horizontal line counter is utilized to ensure that the horizontal multiplier is incremented only after two horizontal lines of pixels are scanned. Likewise, the vertical line counter is utilized to ensure that the vertical multiplier is incremented only after two vertical lines of pixels are scanned.

A pixel counter (PIXEL_COUNT) is also initialized at step 410. The pixel counter keeps track of the total number of pixels found during the scan of one line that match the target pixel pattern stored in the target pattern array.

After completing the above described initialization process, a line of pixels is scanned. Initially, it is determined whether to scan a horizontal or a vertical line at step 420. If the orientation flag (ORIENT_FLAG) is equal to "horizontal" at step 420, a horizontal line is scanned. If, on the other hand, the orientation flag is equal to "vertical" at step 420, a vertical line is scanned.

Assuming that the orientation flag (ORIENT_FLAG) is equal to "horizontal" at step 420, processing continues at step 422, where it is determined whether the horizontal line will be scanned in a "forward" or a "reverse" direction. If the horizontal direction flag (HORIZ_DIR_FLAG) is equal to "forward" at step 424, the X-axis value (X) of the current scan point $(X_s,Y_s)$ is set equal to the vertical start boundary (VERT_START), and the Y-axis value $(Y_s)$ of the current scan point $(X_s,Y_s)$ is set equal to the next horizontal line value $(Y_1)$ at step 424. If, on the other hand, the horizontal direction flag is equal to "reverse" at step 424, the X-axis value $(X_s)$ of the current scan point $(X_s,Y_s)$ is set equal to the vertical end boundary (VERT_END), and the Y-axis value $(Y_s)$ of the current scan point $(X_s,Y_s)$ is set equal to the next horizontal line value $(Y_1)$ at step 426.

A "scan a line" routine is then called at step 427. As explained in more detail below, the "scan a line" routine scans a line of pixels stored in the image memory 18 beginning at the current scan point $(X_s,Y_s)$. The line is oriented as indicated by the orientation flag (ORIENT_FLAG). Moreover, if the orientation flag (ORIENT_FLAG) is equal to "horizontal," scanning occurs in the direction indicated by the horizontal direction flag (HORIZ_DIR_FLAG). If the orientation flag is equal to "vertical," scanning occurs in the direction indicated by the vertical direction flag (VERT_DIR_FLAG). While scanning a line, the "scan a line" routine searches for a pattern of pixels that matches the target pixel pattern stored in the target pattern array (TARGET_PATTERN[0:PATTERN_SIZE]). If the target pattern is found, the "scan a line" routine sets a hit flag (HIT_FLAG) equal to "true."

After the "scan a line" routine completes processing, the hit flag (HIT_FLAG) is examined at stop 428 to determined whether the target pixel pattern was found. If the hit flag (HIT_FLAG) indicates that the target pixel pattern was found and the multiple targets flag (MULT_TARGETS_FLAG) indicates that only one symbol is being searched for, operation of the symbol locator block ends at step 432. Otherwise, the horizontal direction flag (HORIZ_DIR_FLAG) is changed at steps 434, 435, 438.

After scanning a horizontal line of pixels as described above, the next horizontal line value $(Y_1)$ is changed at steps 440-452. More particularly, the horizontal line counter (HORIZ_LINE_COUNT) is incremented at step 440. If the resulting value of the horizontal line counter is an even integer at step 442, the next horizontal line value $(Y_1)$ is set equal to the initial horizontal line value (HORIZ_CENT) minus the product of the horizontal step size (HORIZ_STEP_SIZE) and the horizontal multiplier (HORIZ_MULT) at step 450. This means that the next horizontal line of pixels to be scanned will be located an integer number (HORIZ_MULT) of horizontal step sizes (HORIZ_STEP_SIZE) below the initial horizontal line value (HORIZ_CENT).

If the value of the horizontal line counter is an odd integer at step 442, the horizontal multiplier (HORIZ_MULT) is incremented at step 444. If the resulting value of the horizontal multiplier is an odd integer at step 446, the current horizontal line value $(Y_1)$ is set equal to the sum of the initial horizontal line value (HORIZ_CENT) and the product of the horizontal step size (HORIZ_STEP_SIZE) and the horizontal multiplier (HORIZ_MULT) at step 452. This means that the next horizontal line of pixels to be scanned will be located an integer number (HORIZ_MULT) of horizontal step sizes (HORIZ_STEP_SIZE) above the initial horizontal line value (HORIZ_CENT).

If, on the other hand, the value of the horizontal multiplier is an even integer at step 446, the horizontal line counter (HORIZ_LINE_COUNT) is incremented two times at steps 448 and 440, causing the horizontal multiplier (HORIZ_MULT) to increment to the next odd valued integer at step 444. Thus, even integer values of the horizontal multiplier (HORIZ_MULT) are not utilized to change the value of the next horizontal line value $(Y_1)$.

After changing the next horizontal line value $(Y_1)$ as described above, it is determined whether the next horizontal line value $(Y_1)$ is within the search area 302 at steps 454-464. More particularly, it is determined whether the next horizontal line value $(Y_1)$ is greater than the value of the horizontal start boundary (HORIZ_START) 306 but less than the value of the horizontal end boundary (HORIZ_END) 310 at step 454. If so, the orientation flag (ORIENT_FLAG) is set to "vertical" at step 464, indicating that the next line of pixels to be scanned will be a vertical line. Processing then returns to step 420 to scan a vertical line.

If, however, it is determined at step 454 that the next horizontal line value $(Y_1)$ is not located within the search area, the horizontal step size (HORIZ_STEP_SIZE) is reduced at step 456, and it is determined whether the horizontal step size is less than the minimum horizontal step size (HORIZ_MIN_STEP) at step 458. If so, operation of the symbol locator block 104 ends at step 460. Otherwise, the horizontal multiplier (HORIZ_MULT) and the horizontal line counter (HORIZ_LINE_COUNT) are reset at step 462; the next horizontal line value (Y1) is set equal to the sum of the initial horizontal line value (HORIZ_CENT) and the horizontal step size (HORIZ_STEP_SIZE) at step 462; the orientation flag (ORIENT_FLAG) is set to "vertical" at step 464; and processing returns to step 420 to scan a vertical line.

If it is determined at step 420 that the orientation flag (ORIENT_FLAG) is equal to "vertical," processing continues at step 470, where it is determined whether the vertical line will be scanned in the "forward" or the "reverse" direction. If the vertical direction flag (VERT_DIR_FLAG) is equal to "forward" at step 470, the X-axis value $(X_s)$ of the current scan point $(X_s,Y_s)$ is set equal to the next vertical line value $(X_1)$, and the Y-axis value $(Y_s)$ of the current scan point $(X_s,Y_s)$ is set equal to the horizontal start boundary (HORIZ_START) at step 474. If, on the other hand, the vertical direction flag (VERT_DIR_FLAG) is equal to "reverse" at step 470, the X-axis value $(X_s)$ of the current scan point $(X_s,Y_s)$ is set equal to the next vertical line value $(X_1)$, and the Y-axis value $(Y_s)$ of the current scan point $(X_s,Y_s)$ is set equal to the horizontal end boundary (HORIZ_END) at step 472. The "scan a line" routine is then called at step 475.

After the "scan a line" routine completes processing, the hit flag (HIT_FLAG) is examined at step 476 to determined whether the target pixel pattern stored in the target pattern array (TARGET_PATTERN[0:PATTERN_SIZE]) was found. If the hit flag (HIT_FLAG) indicates that the target pixel pattern was found and the multiple targets flag (MULT_TARGETS_FLAG) indicates that only one target is being searched for, the symbol locator block ends at step 479. Otherwise, the symbol locator block changes the vertical direction flag (VERT_DIR_FLAG) at steps 480, 482, 484.

After scanning a vertical line of pixels as described above, the next vertical line value ($X_1$) is changed at steps 486-498. More particularly, the vertical line counter (VERT_LINE_COUNT) is incremented at step 486. If the resulting value of the vertical line counter is an even integer at step 488, the next vertical line value ($X_1$) is set equal to the initial vertical line value (VERT_CENT) minus the product of the vertical step size (VERT_STEP_SIZE) and the vertical multiplier (VERT_MULT) at step 496. This means that the next vertical line of pixels to be scanned will be located an integer number (VERT_MULT) of vertical step sizes (VERT_STEP_SIZE) to the left of the initial vertical line value (VERT_CENT).

If the value of the vertical line counter is an odd integer at step 488, the vertical multiplier (VERT_MULT) is incremented at step 492. If the resulting value of the vertical multiplier is an odd integer at step 492, the next vertical line value ($X_1$) is set equal to the sum of the initial vertical line value (VERT_CENT) and the product of the vertical step size (VERT_STEP_SIZE) and the vertical multiplier (VERT_MULT) at step 496. This means that the next vertical line of pixels to be scanned will be located an integer number (VERT_MULT) of vertical step sizes (VERT_STEP_SIZE) to the right of the initial vertical line value (VERT_CENT).

If, on the other hand, the value of the vertical multiplier is an even integer at step 492, the vertical line counter (VERT_LINE_COUNT) is incremented two times at steps 494 and 486, causing the vertical multiplier (VERT_MULT) to increment to the next odd valued integer at step 490. Thus, even integer values of the vertical multiplier (VERT_MULT) are not utilized to change the value of the next vertical line value ($X_1$).

After changing the next vertical line value ($X_1$) as described above, it is determined whether the next vertical line value ($X_1$) is within the search area 302 at steps 500-508. More particularly, it is determined whether the next vertical line value ($X_1$) is greater than the value of the vertical start boundary (VERT_START) 304 but less than the value of the vertical end boundary (VERT_END) 308 at step 500. If so, the orientation flag (ORIENT_FLAG) is set to "horizontal" at step 510, indicating that the next line of pixels to be scanned will be a horizontal line. Processing then returns to step 420 to scan a horizontal line.

If, however, it is determined at step 500 that the next vertical line value ($X_1$) is not located within the search area, the vertical step size (VERT_STEP_SIZE) is reduced at step 502, and it is determined whether the vertical step size is less than the minimum vertical step size (VERT_MIN_STEP) at step 504. If so, operation of the symbol locator block 104 ends at step 506. Otherwise, the vertical multiplier (VERT_MULT) and the vertical line counter (VERT_LINE_COUNT) are reset at step 508; the next vertical line value ($X_1$) is set equal to the sum of the initial vertical line value (VERT_CENT) and the vertical step size (VERT_STEP_SIZE) at step 508; the orientation flag (ORIENT_FLAG) is set to "horizontal" at step 510; and processing returns to step 420 to scan a horizontal line.

Figure 5A:
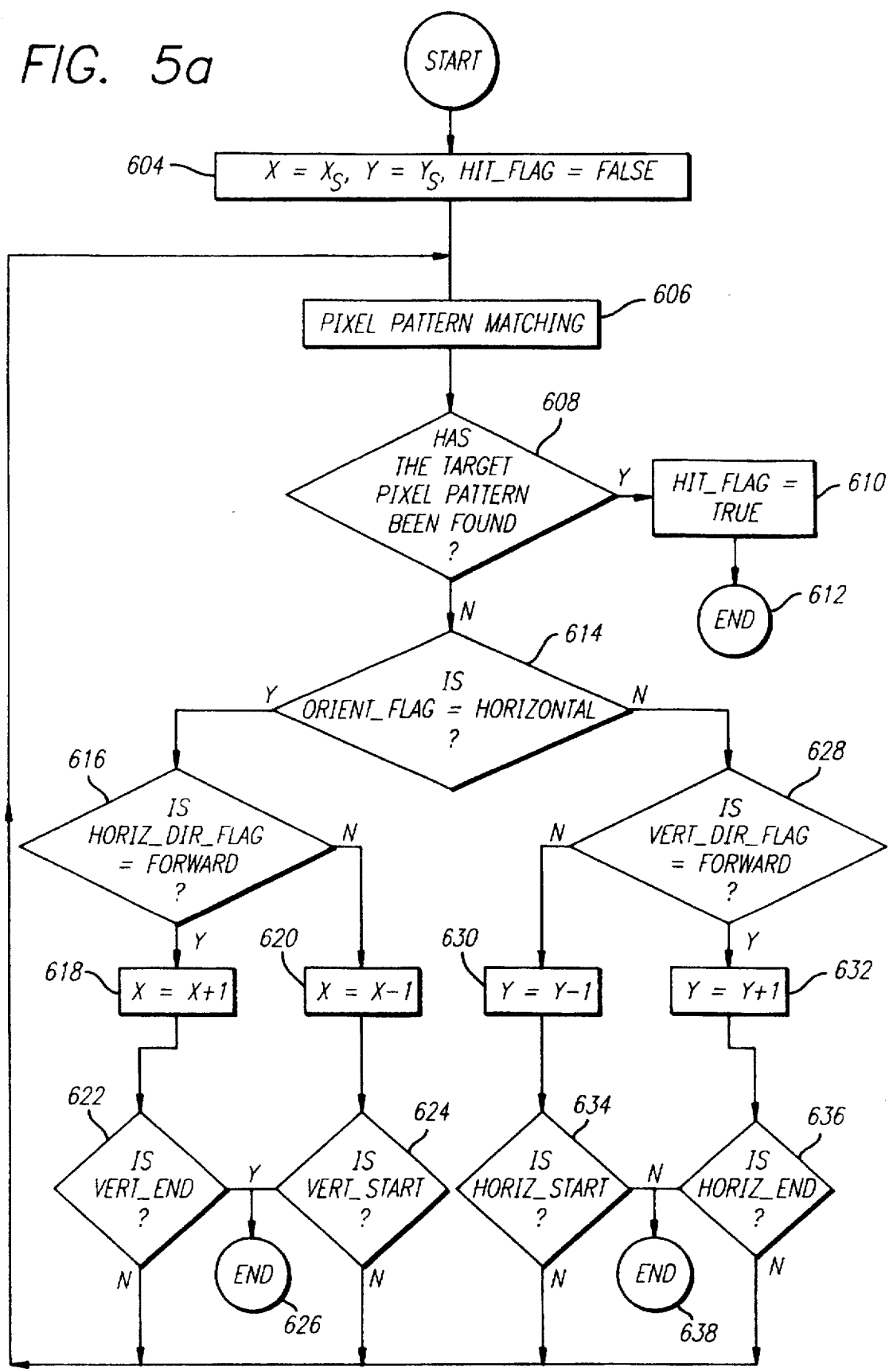
FIG. 5a illustrates the operation of the "scan a line" routine.

An exemplary operation of the "scan a line" routine will now be described with reference to FIG. 5a. A current point (X,Y) defining the pixel of the digitized image stored in the image memory 18 that is currently being read is initially set equal to the current scan point ($X_s,Y_s$) at step 604. A hit flag (HIT_FLAG) is also initialized at step 604 by setting it to "false," indicating that the target pixel pattern stored in the target pattern array (TARGET_PATTERN[0:PATTERN_SIZE]) has not yet been found.

A "pixel pattern matching" subroutine is then called at step 606. As will be described below, the "pixel pattern matching" subroutine determines whether the pixel located at the current point (X,Y) within the digitized image stored in the image memory 18 matches the pixel in the target pixel pattern array pointed to by the pixel counter (PIXEL_COUNT). After the "pixel pattern matching" subroutine completes processing, it is determined whether the current point (X,Y) matches the last pixel in the target pixel pattern at step 608. If so, the hit flag (HIT_FLAG) is set equal to "true" at step 610, and operation of the "scan a line" routine ends at step 612. Otherwise, the "scan a line" routine examines the orientation flag (ORIENT_FLAG) at step 614 to determine whether the line being scanned is a horizontal or a vertical line.

If the line being scanned is a horizontal line, the "scan a line" routine increments or decrements the X-axis value (X) of the current point (X,Y) at steps 618 or 620, depending on whether the horizontal direction flag (HORIZ_DIR_FLAG) is set to "forward" or "reverse." The "scan a line" routine then determines whether the X-axis value (X) of the current point (X,Y) is within the search area at steps 622 or 624. If so, the "scan a line" routine returns to the step of calling the "pixel pattern matching" subroutine at step 606. Otherwise, the "scan a line" routine ends at step 626.

Figure 5B:
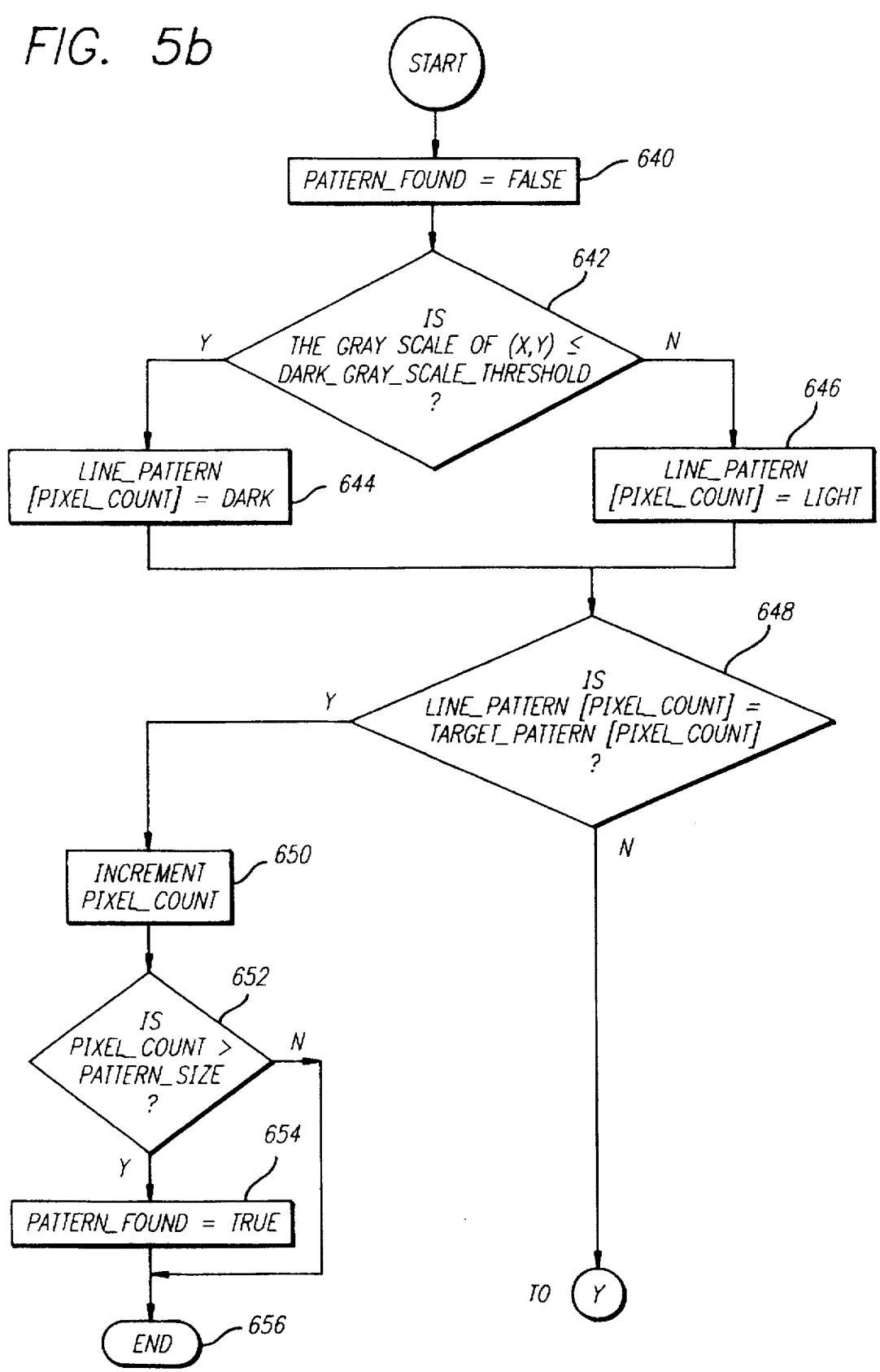
FIGS. 5b–5c illustrate the operation of the "pixel pattern matching" subroutine.
Figure 5C:
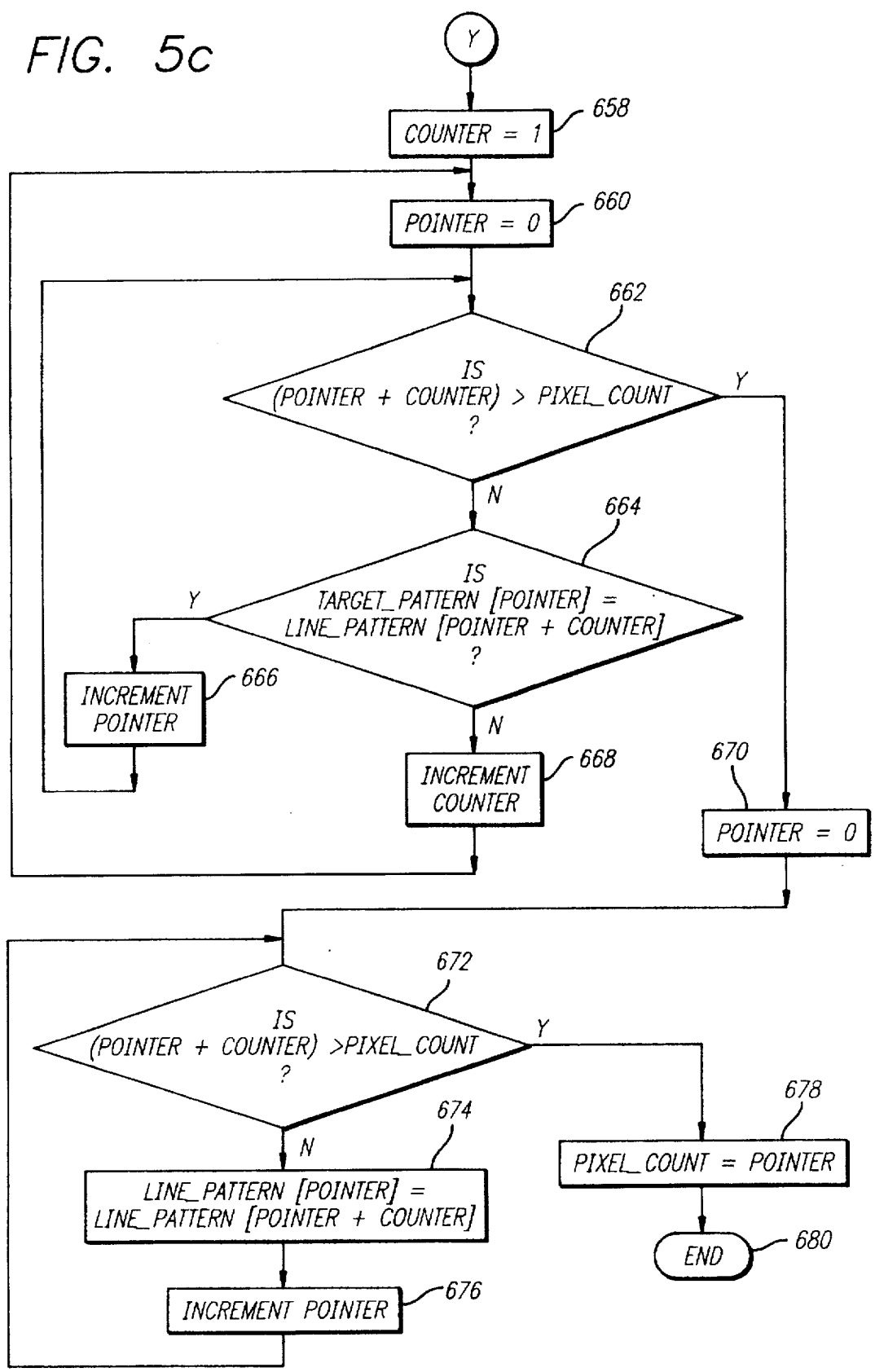

An exemplary operation of the "pixel pattern matching" subroutine will now be described with reference to FIGS. 5b-5c. The subroutine begins by setting a pattern found flag (PATTERN_FOUND) equal to "false" at step 640, indicating that the target pixel pattern stored in the target pattern array (PIXEL_PATTERN[0:PATTERN_SIZE]) has not yet been found. It is then determined at step 642 whether the pixel of the digitized image stored in the image memory 18 at the current point (X,Y) is a "dark" or "light" pixel. As shown in FIG. 5b, that determination is made by comparing the gray scale value of the pixel located at the current point (X,Y) with the minimum dark gray scale value received at step 402. The result of that determination is stored in the element of the line pattern array (LINE_PATTERN [0:PATTERN_SIZE]) pointed to by the pixel counter (PIXEL_COUNT) at step 644 or 646. The most recent series of pixels located along the line of pixels currently being scanned that match corresponding pixels in the target pattern are stored in the line pattern array. Like the target pattern array, the line pattern array (LINE_PATTERN [0:PATTERN_SIZE]) can be a single dimensional array.

The pixel at the current point (X,Y) is then compared to the pixel stored in the target pattern array at the element pointed to by the pixel counter (TARGET_PATTERN [PIXEL_COUNT]) at step 648. If there is a match at step 648, the pixel counter is incremented at step 650, and it is determined whether the pixel counter (PIXEL_COUNT) is larger than the target pattern size (PATTERN_SIZE) at step 652. If so, a pattern of pixels matching the target pixel pattern has been found, and the pattern found flag (PATTERN_FOUND) is set equal to "true" at step 654. If the pixel counter is not larger than the target pattern size, all of the pixels in the target pixel pattern have not yet been found, and processing returns to the "scan a line" routine at step 656.

If there is not a match at step 648, it is determined whether any portion of the previously scanned pixels stored in the line pattern array (LINE_PATTERN[0:PATTERN_SIZE]) match a corresponding portion of the target pixel pattern stored in the target pattern array (TARGET_PATTERN [0:PATTERN_SIZE]). More particularly, the sequence of pixels stored in the line pattern array beginning at the second element (LINE_ARRAY[1]) and ending at the element pointed to by the pixel counter (LINE_ARRAY[PIXEL_COUNT]) are compared to the pixels stored in the target pattern array beginning at the first element (TARGET_PATTERN[0]) and ending at an element pointed to by the pixel counter minus one (TARGET_PATTERN[PIXEL_COUNT-1]) at steps 662, 664, 666. If the above described sequence in the line pattern array matches the above described sequence in the target pattern array, the pixel stored in the first element of the line pattern array (LINE_PATTERN[0]) is discarded, and the pixel in every remaining element of the line pattern array is moved to the preceding element of the line pattern array at steps 672, 674, 676. For example, the pixel stored in the second element of the line pattern array (LINE_PATTERN[1]) is moved to the first element of the line pattern array (LINE_PATTERN[0]); the pixel stored in the third element of the line pattern array (LINE_PATTERN[2]) is moved to the second element of the line pattern array (LINE_PATTERN[1]); etc.

If the above described sequence in the line pattern array does not match the above described sequence in the target pattern array, repeatedly smaller sequences of pixels stored in the line pattern array are compared to equally smaller sequences of corresponding pixels stored in the target pattern array at steps 660, 662, 664, 666, 668. This continues until either matching sequences are found, or it is determined that no sequence of pixels stored in the line pattern array (LINE_PATTERN[0:PATTERN_SIZE]) matches a sequence of pixels stored in the target pattern array (TARGET_PATTERN[0:PATTERN_SIZE]). If matching sequences are found, the matching sequence is stored in the first elements of the line pattern array (LINE_PATTERN [0:PATTERN_SIZE]) at steps 672, 674, 676, and the pixel counter (PIXEL_COUNT) is set equal to the next empty element in the line pattern array at step 678. If, on the other hand, it is determined that no sequence of pixels stored in the line pattern array (LINE_PATTERN[0:PATTERN_SIZE]) matches a sequence of pixels stored in the target pattern array (TARGET_PATTERN[0:PATTERN_SIZE]), the pixel counter (PIXEL_COUNT) is set to zero at step 678.

Figure 6A:
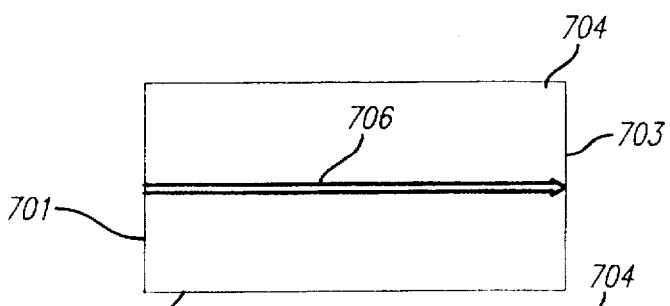
FIGS. 6a–6m illustrate an exemplary search pattern generated by operation of the preferred embodiment of the symbol locator block.
Figure 6B:
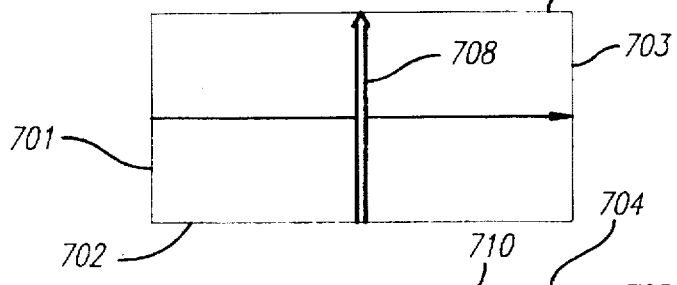
Figure 6C:
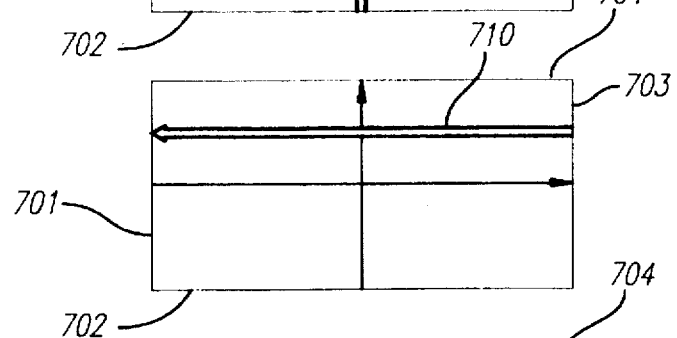
Figure 6D:
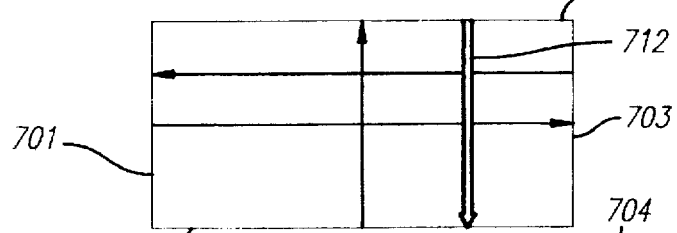
Figure 6E:
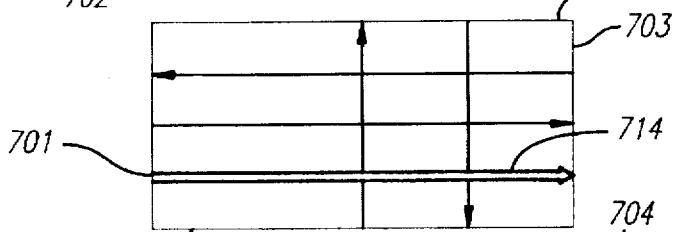
Figure 6F:
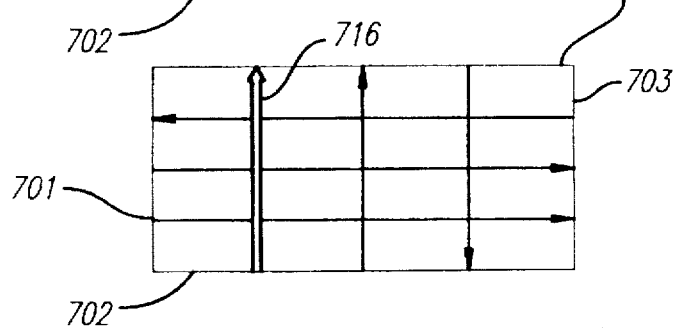
Figure 6G:
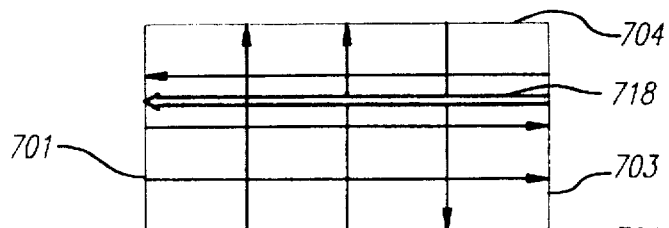

An exemplary search pattern generated by the preferred embodiment of the symbol locator block illustrated in FIGS. 4a–4e is shown in FIGS. 6a–6m. The search area shown in FIGS. 6a–6m is bounded by a horizontal start boundary (HORIZ_START) 702, a horizontal end boundary (HORIZ_END) 704, a vertical start boundary (VERT_START) 701, and a vertical end boundary (VERT_END) 703. Because the orientation flag (ORIENT_FLAG) is initially set equal to "horizontal" and the horizontal direction flag (HORIZ_DIR_FLAG) is initially set equal to "forward" at step 408, the process illustrated in FIGS. 4a–4e begins by scanning an initial horizontal line 706 in the forward direction as shown in FIG. 6a. An initial vertical line 708 is then scanned in the forward direction as shown in FIG. 6b. Subsequent horizontal and vertical lines 710, 712, 714, 716 are then scanned as shown in FIGS. 6c–6f. Each subsequent horizontal line 710, 714 is located an odd multiple of horizontal step sizes either above or below the initial horizontal line 706. Also, the direction in which each subsequent horizontal line 710, 714 is scanned is alternated between forward and reverse. Likewise, each subsequent vertical line 712, 716 is located an odd multiple of vertical step sizes either to the right or left of the initial vertical line 708, and the direction in which each subsequent vertical line 712, 716 is scanned is alternated between forward and reverse.

Once it is determined that a subsequent horizontal line would be located on or outside a horizontal boundary 702, 704 at step 500 and the horizontal line step size (HORIZ_STEP_SIZE) is reduced at step 502, a series of additional horizontal lines 718, 722, 726, 730 are scanned. Those additional horizontal lines are located an odd multiple of the reduced horizontal step size above and below the initial horizontal line 706 as shown in FIGS. 6g, 6i, 6k, and 6m. The direction in which those additional lines are scanned is alternated between forward and reverse.

Figure 6H:
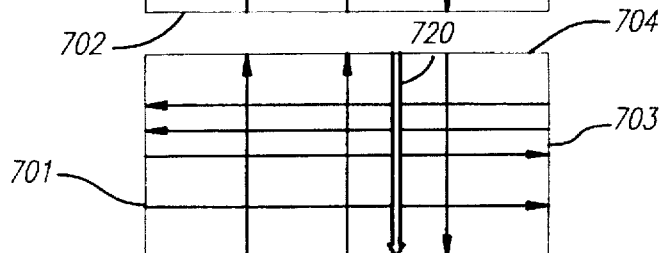
Figure 6I:
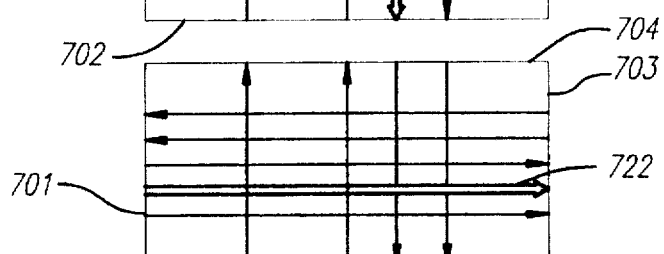
Figure 6J:
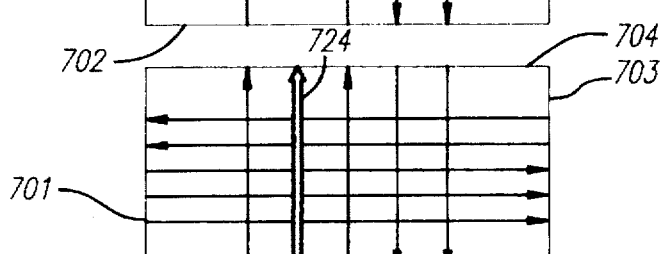
Figure 6K:
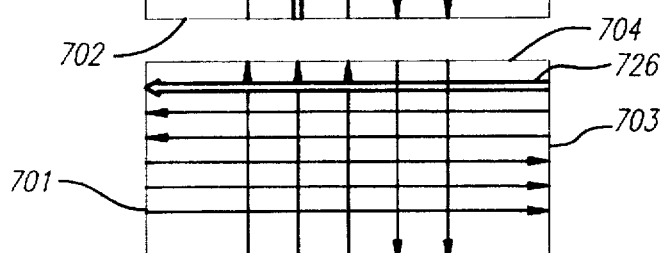
Figure 6L:
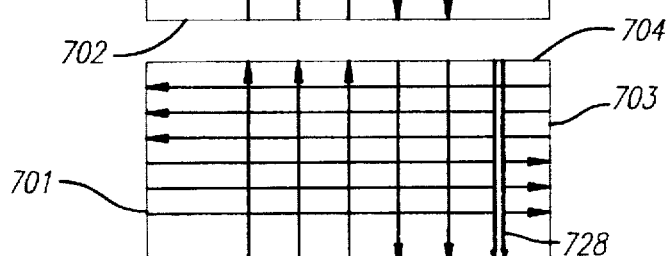
Figure 6M:
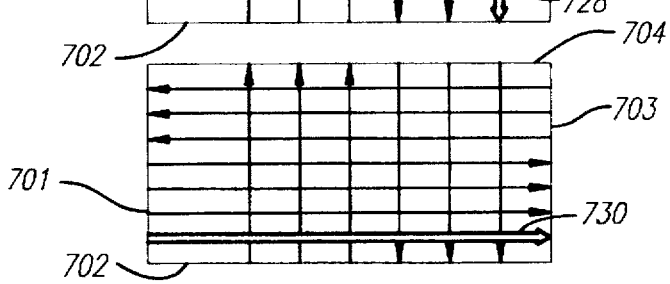
Figure 7A:
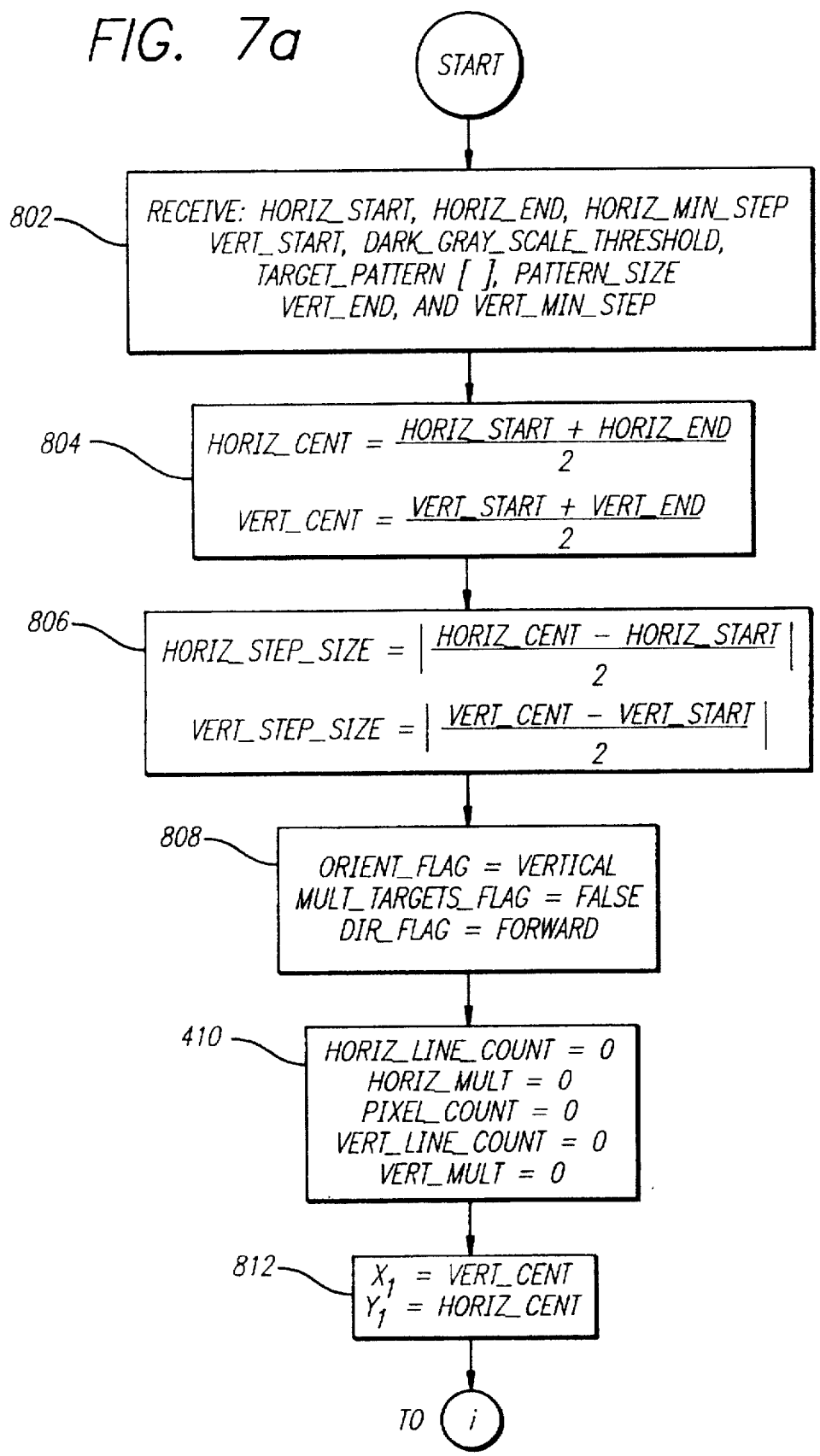
FIGS. 7a–7d illustrate the operation of a first alternative embodiment of the symbol locator block.
Figure 7B:
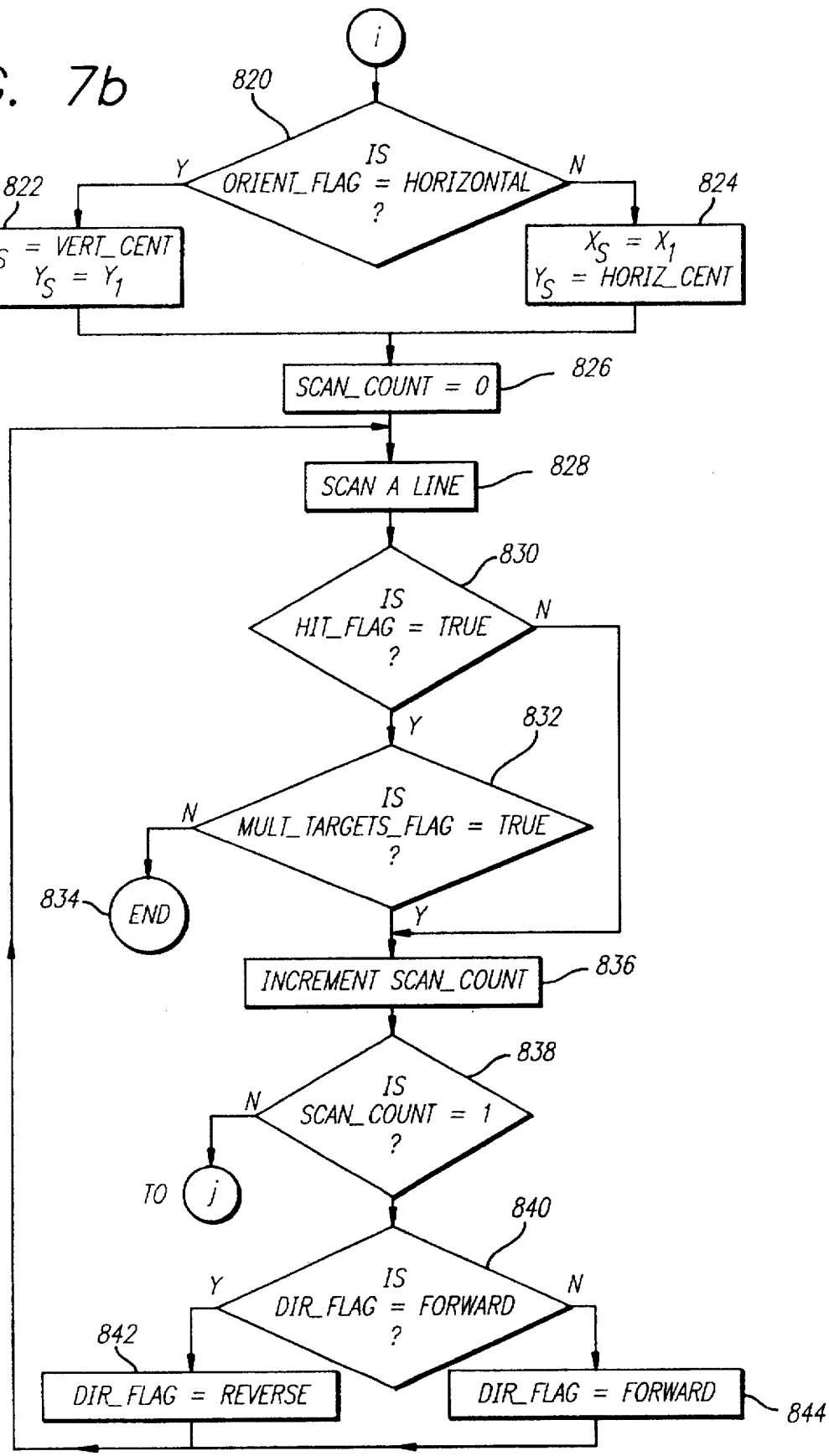
Figure 7C:
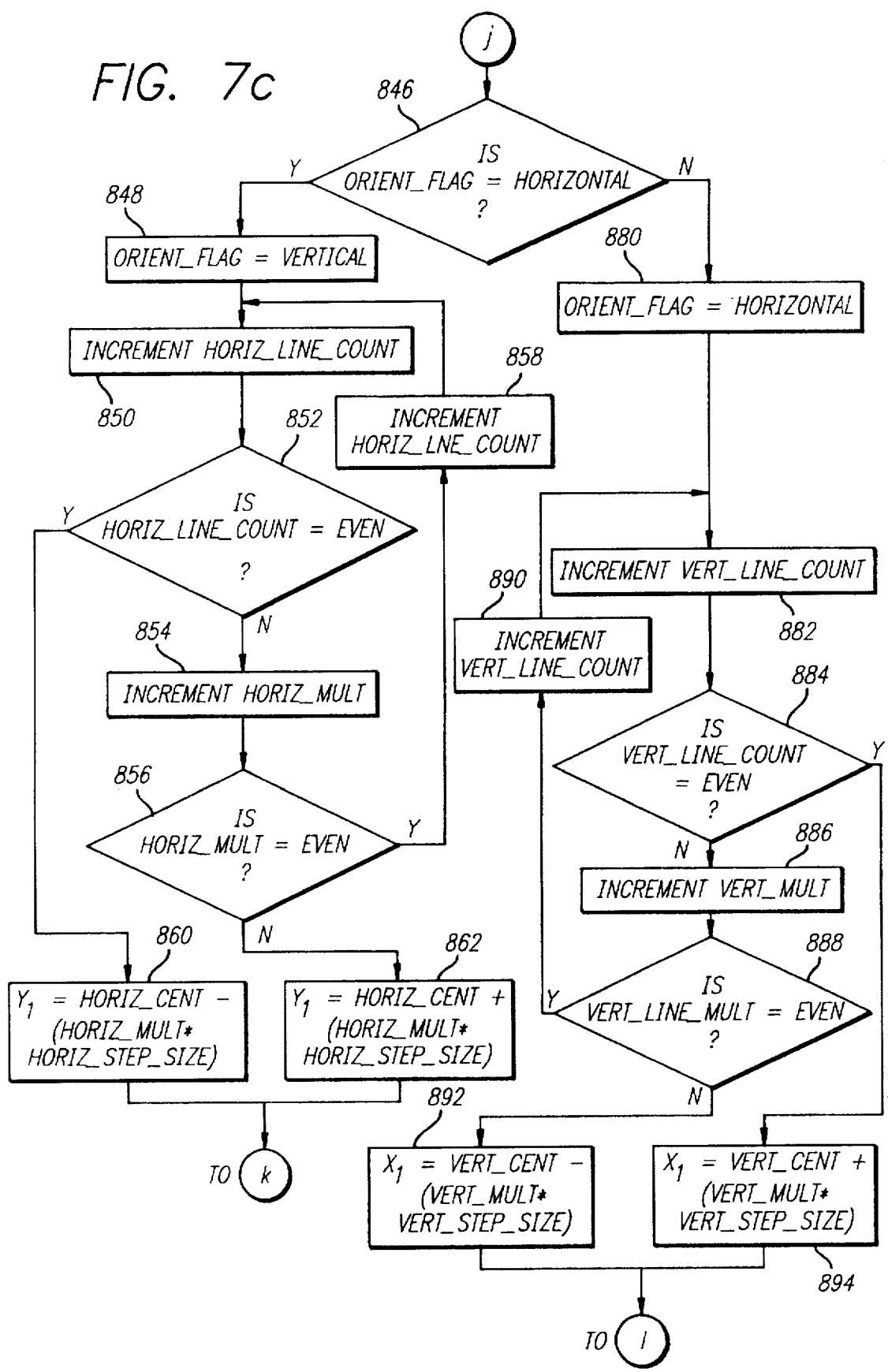
Figure 7D:
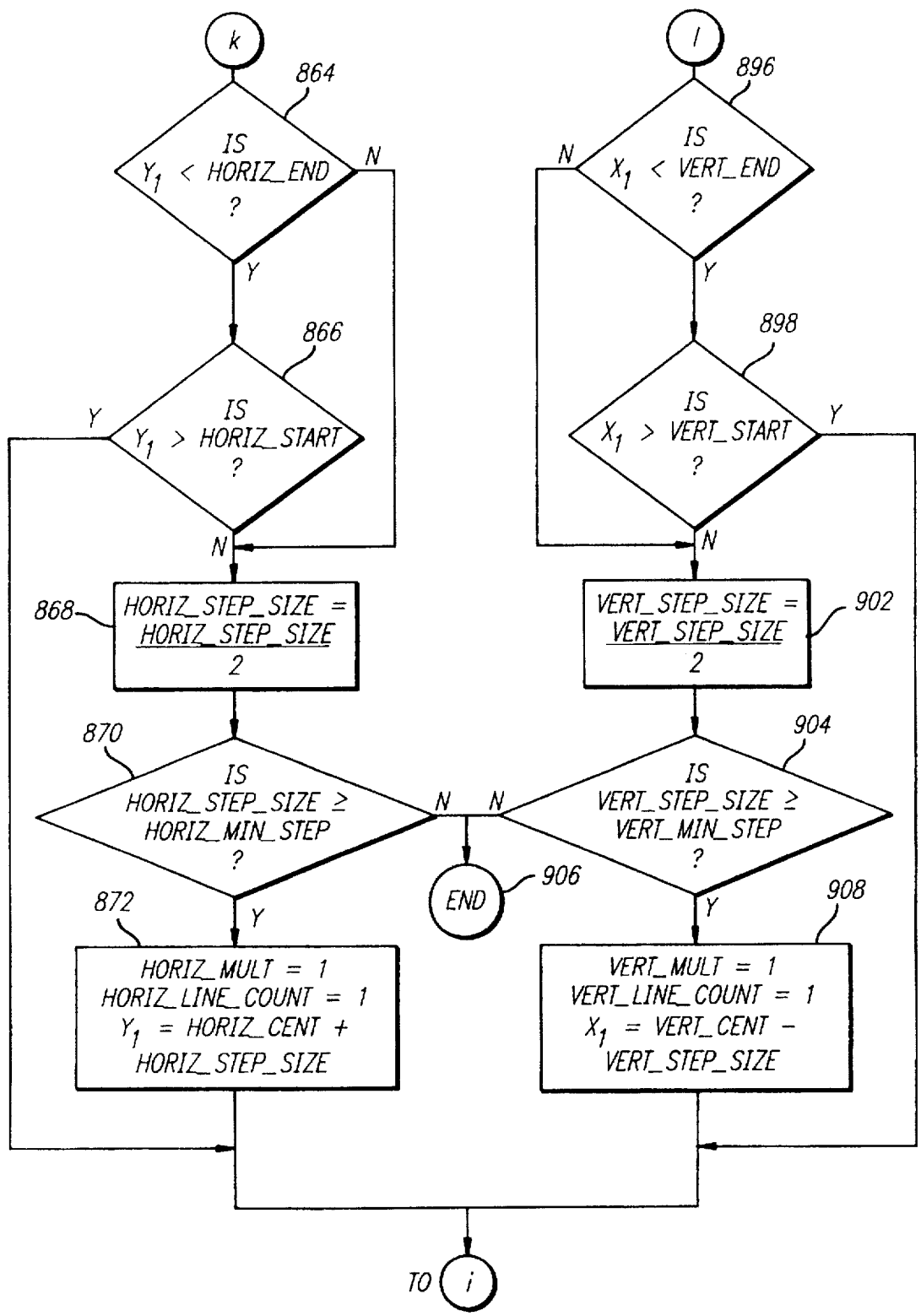

Likewise, once it is determined that a subsequent vertical line would be located on or outside a vertical boundary 701, 703 at step 454 and the vertical step size (VERT_STEP_SIZE) is reduced at step 456, a series of additional vertical lines 720, 724, 728 are scanned. Those additional vertical lines are located an odd multiple of the reduced vertical step size to the right or left of the initial vertical line 708 as shown in FIGS. 6h, 6j, and 6l, and the direction in which those additional lines is scanned is alternated between forward and reverse.

Assuming that the predetermined symbol is not found, the above search pattern would continue until either the horizontal step size becomes smaller than the minimum horizontal step size or the vertical step size becomes smaller than the minimum vertical step size. In the exemplary pattern shown in FIGS. 6a–6m, the horizontal step size (HORIZ_STEP_SIZE) is reduced to a value that is less than the minimum horizontal step size (HORIZ_MIN_STEP) after line 730 is scanned, which causes the symbol locator block 104 to terminate processing at step 460.

3. First Alternative Embodiment of the Symbol Locator Block

Operation of a first alternative embodiment of the symbol locator block 104 will now be described with reference to FIGS. 7a–7d. Operation of the first alternative embodiment of the symbol locator block 104 begins with an initialization process that is similar to the initialization process of the preferred embodiment as described above with two exceptions. First, a single direction flag (DIR_FLAG) is utilized in the first alternative embodiment, rather than a horizontal direction flag (HORIZ_DIR_FLAG) and a vertical direction flag (VERT_DIR_FLAG) as used in the preferred embodiment. Second, the first alternative embodiment initially sets the orientation flag (ORIENT_FLAG) equal to "vertical" at step 808.

After completing the above described initialization process, a line of pixels is scanned. Initially, it is determined whether to scan a horizontal or a vertical line at step 820. If the orientation flag (ORIENT_FLAG) is equal to "horizontal" at step 820, the X-axis value ($X_s$) of the current scan point ($X_s$, $Y_s$) is set equal to the initial vertical line value (VERT_CENT), and the Y-axis value ($Y_s$) of the current scan point $(X_s, Y_s)$ is set equal to the next horizontal line value $(Y_1)$ at step 822. If, on the other hand, the orientation flag (ORIENT_FLAG) is equal to "vertical" at step 820, the X-axis value $(X_s)$ of the current scan point $(X_s, Y_s)$ is set equal to the next vertical line value $(X_1)$, and the Y-axis value $(Y_s)$ of the current scan point $(X_s, Y_s)$ is set equal to the initial horizontal line value (HORIZ_CENT) at step 824.

The "scan a line" routine is then called at step 828. Operation of the "scan a line" routine has been described above with reference to FIGS. 6a–6c. After the "scan a line" routine completes processing, the hit flag (HIT_FLAG) is examined at step 830 to determine whether the target pixel pattern stored in the target pattern array (TARGET_PATTERN[0:PATTERN_SIZE]) was found. If the hit flag indicates that the target pixel pattern was found and the multiple targets flag (MULT_TARGETS_FLAG) indicates that only one symbol is being searched for, operation of the symbol locator block ends at step 834. Otherwise, the direction flag (DIR_FLAG) is changed at steps 840, 842, 844, and the "scan a line" routine is called again at step 828, and the steps of determining whether the target pixel pattern was found or the multiple targets flag is equal to "true" are repeated.

Assuming that the target pixel pattern was not found or that the multiple targets flag is equal to "true," it is next determined whether the orientation flag (ORIENT_FLAG) is equal to "horizontal" at step 846. If it is determined at step 846 that the orientation flag is equal to "horizontal," the orientation flag is set equal to "vertical" at step 848, and the value of the next horizontal line value $(Y_1)$ is changed. The steps for changing the next horizontal line value $(Y_1)$ are illustrated by steps 850–862 of FIG. 7c, and are similar to the steps utilized by the preferred embodiment to change the next horizontal line value $(Y_1)$, which are described above with reference to steps 440–452 of FIG. 4d.

After changing the next horizontal line value $(Y_1)$ as described above, it is determined whether the next horizontal line value is within the search area at steps 864–872. More particularly, it is determined whether the next horizontal line value $(Y_1)$ is greater than the horizontal start boundary (HORIZ_START) 306 but less than the horizontal end boundary (HORIZ_END) 310 at steps 864, 866. If so, processing returns to step 820 to scan a new line.

If, however, it is determined at steps 864, 866 that the next horizontal line value $(Y_1)$ is not located within the search area, the horizontal step size (HORIZ_STEP_SIZE) is reduced at step 868, and it is determined whether the horizontal step size is less than the minimum horizontal step size (HORIZ_MIN_STEP) at step 870. If so, operation of the symbol locator block 104 ends at step 906. Otherwise, the horizontal multiplier (HORIZ_MULT) and the horizontal line counter (HORIZ_LINE_COUNT) are reset at step 872; the next horizontal line value (HORIZ_ONE) is set equal to the sum of the initial horizontal line value (HORIZ_CENT) and the horizontal step size (HORIZ_STEP_SIZE) at step 872; and processing returns to step 820 to scan a new line.

If it is determined at step 846 that the orientation flag is equal to "vertical," the orientation flag is set equal to "horizontal" at step 880, and the value of the next vertical line value $(X_1)$ is changed. The steps utilized to change the next vertical line value $(X_1)$ are illustrated by steps 882–894 of FIG. 7c, and are similar to the steps utilized by the preferred embodiment to change the next vertical line value $(X_1)$, which are described above with reference to steps 486–498 of FIG. 4e.

After changing the next vertical line value $(X_1)$ as described above, it is determined whether the next vertical line value is within the search area at steps 864–872. More particularly, it is determined whether the next vertical line value $(X_1)$ is greater than the vertical start boundary (VERT_START) 306 but less than the vertical end boundary (VERT_END) 310 at steps 896, 898. If so, processing returns to step 820 to scan a new line.

If, however, it is determined at steps 896, 898 that the next vertical line value $(X_1)$ is not located within the search area, the vertical step size (VERT_STEP_SIZE) is reduced at step 902, and it is determined whether the vertical step size is less than the minimum vertical step size (VERT_MIN_STEP) at step 904. If so, operation of the symbol locator block 104 ends at step 906. Otherwise, the vertical multiplier (VERT_MULT) and the vertical line counter (VERT_LINE_COUNT) are reset at step 908; the next vertical line value $(X_1)$ is set equal to the sum of the initial vertical line value (VERT_CENT) and the vertical line size (VERT_STEP_SIZE) at step 908; and processing returns to step 820 to scan a new line.

Figure 8A:
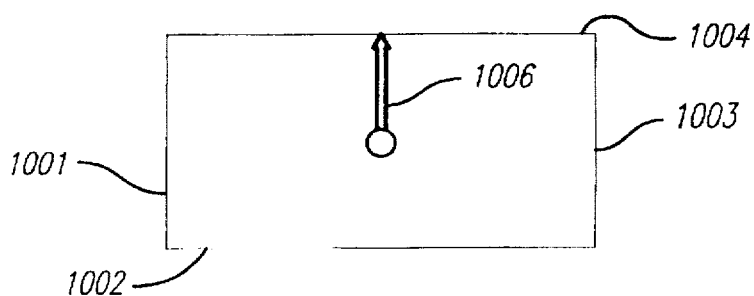
FIGS. 8a–8l illustrate an exemplary search pattern generated by operation of the first alternative embodiment of the symbol locator block.
Figure 8B:
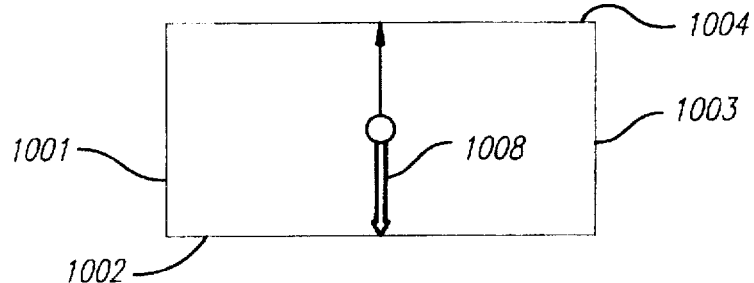
Figure 8C:
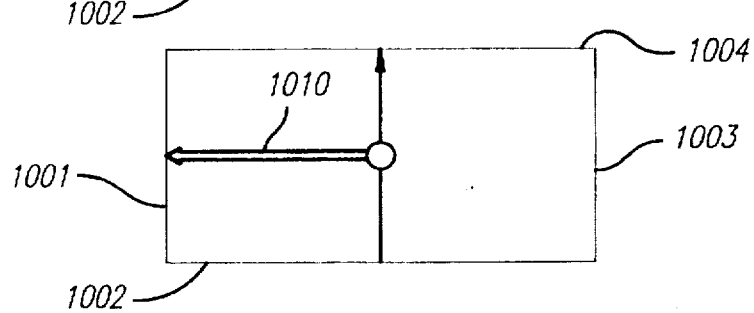
Figure 8D:
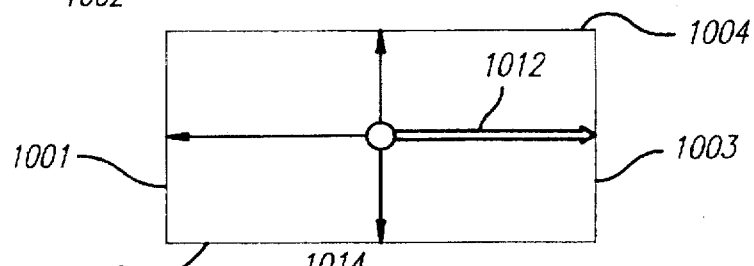
Figure 8E:
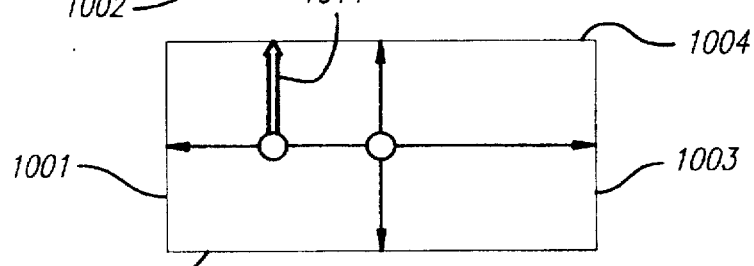
Figure 8F:
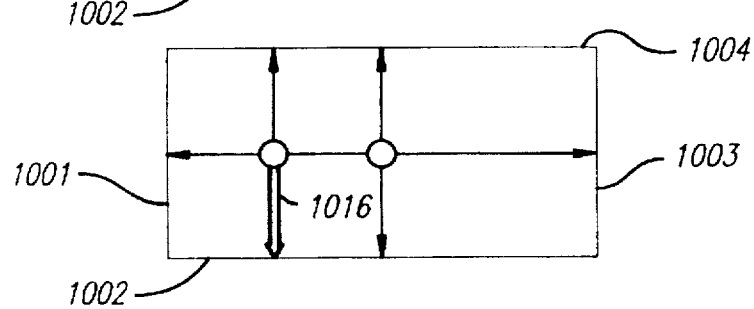
Figure 8G:
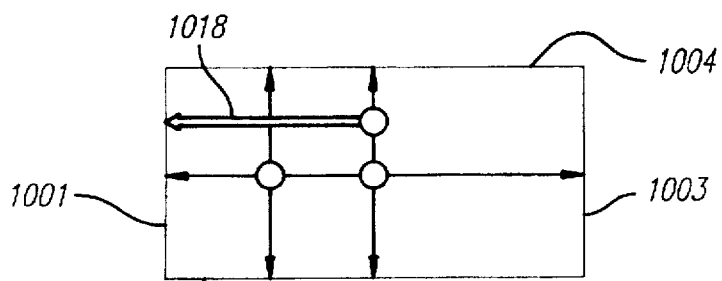
Figure 8H:
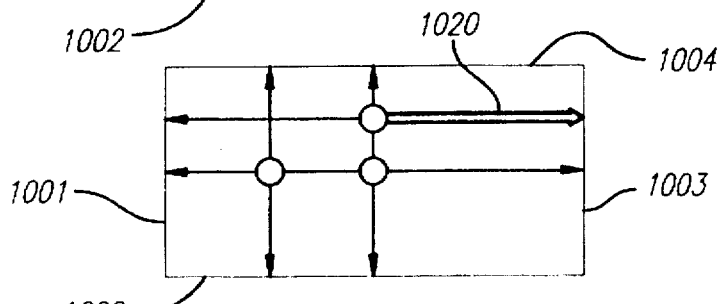
Figure 8I:
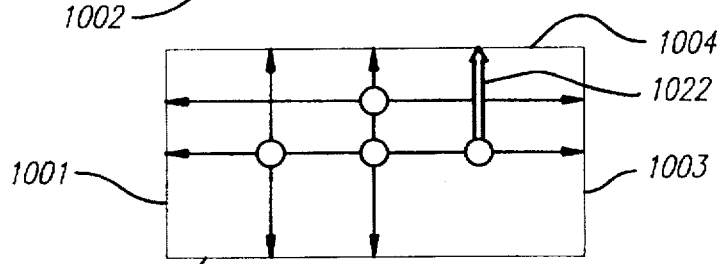
Figure 8J:
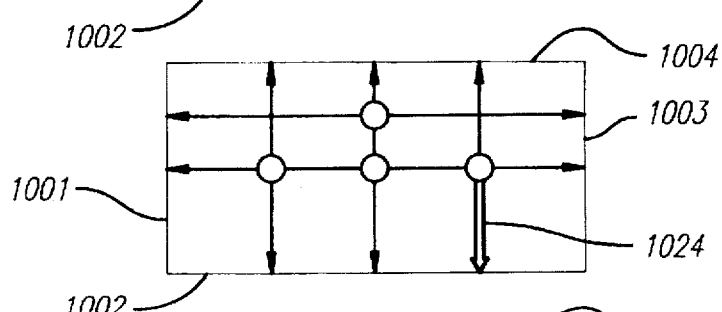
Figure 8K:
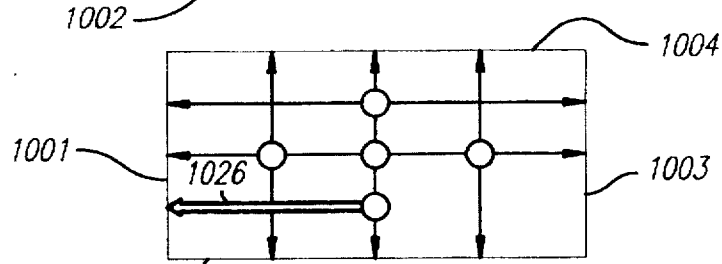
Figure 8L:
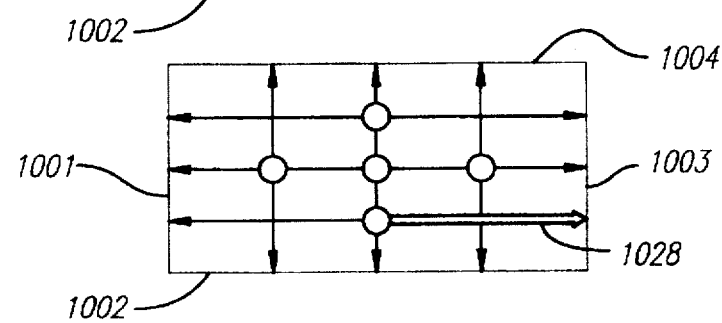
Figure 9A:
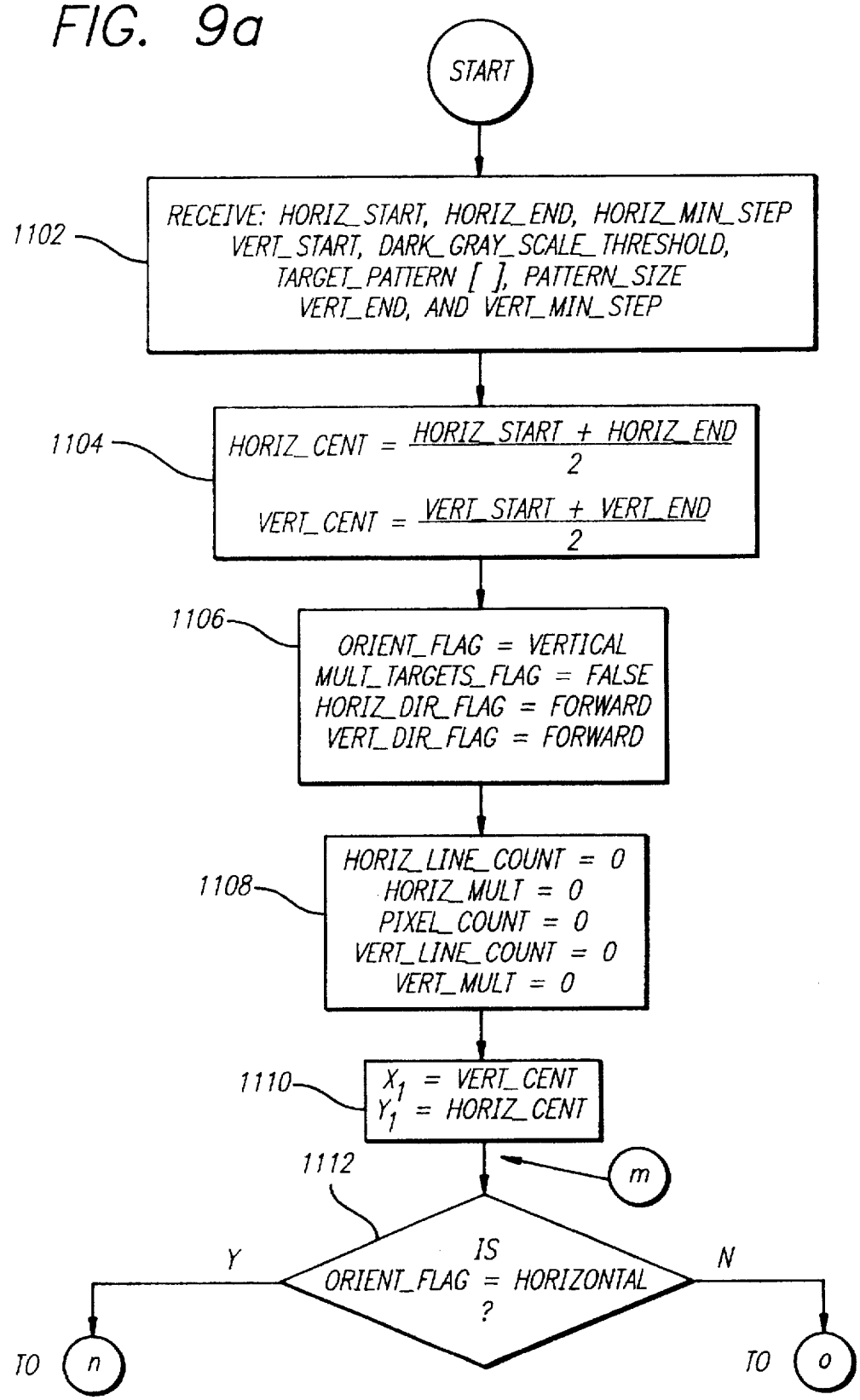
Figure 9B:
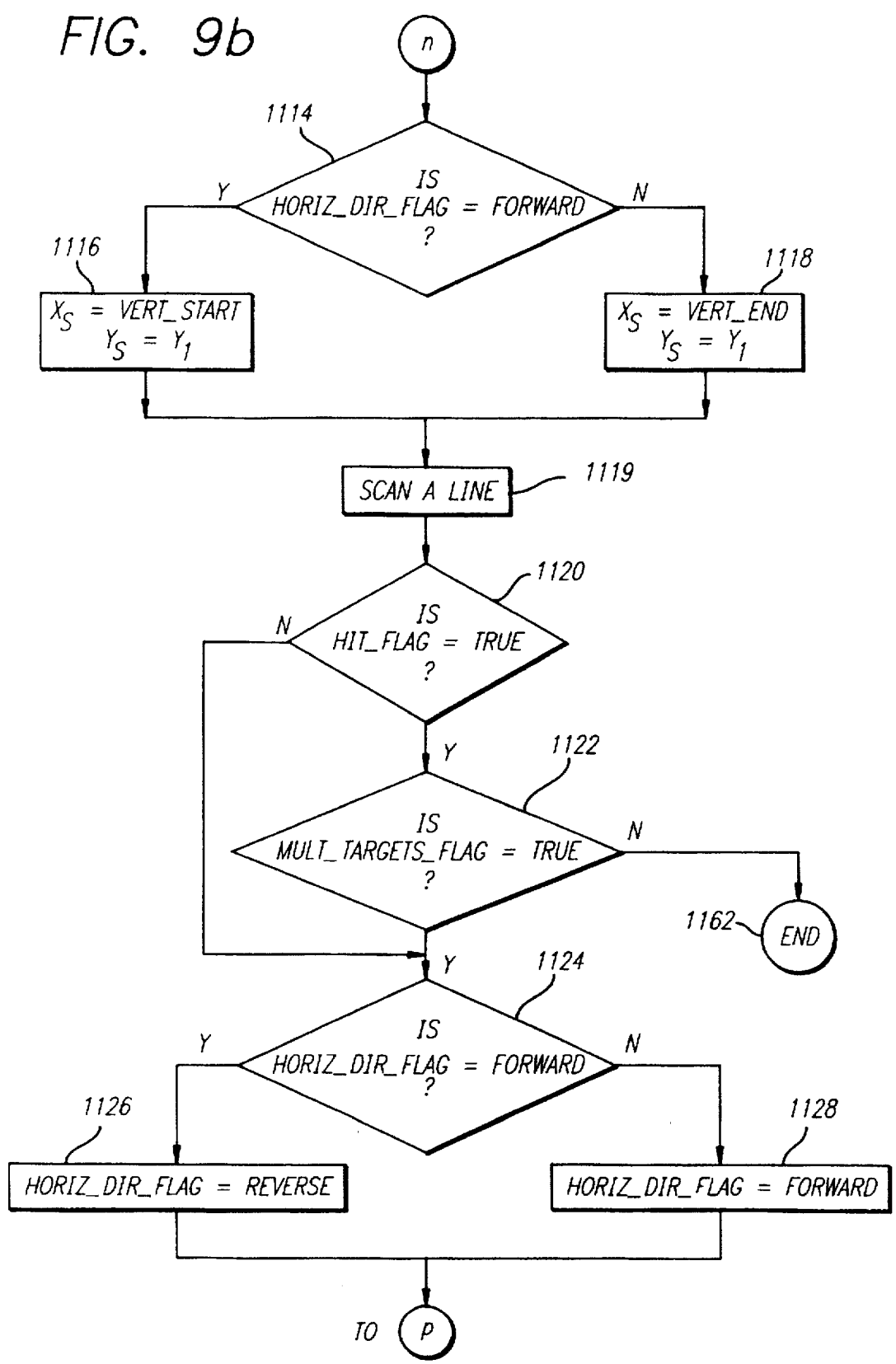
Figure 9D:
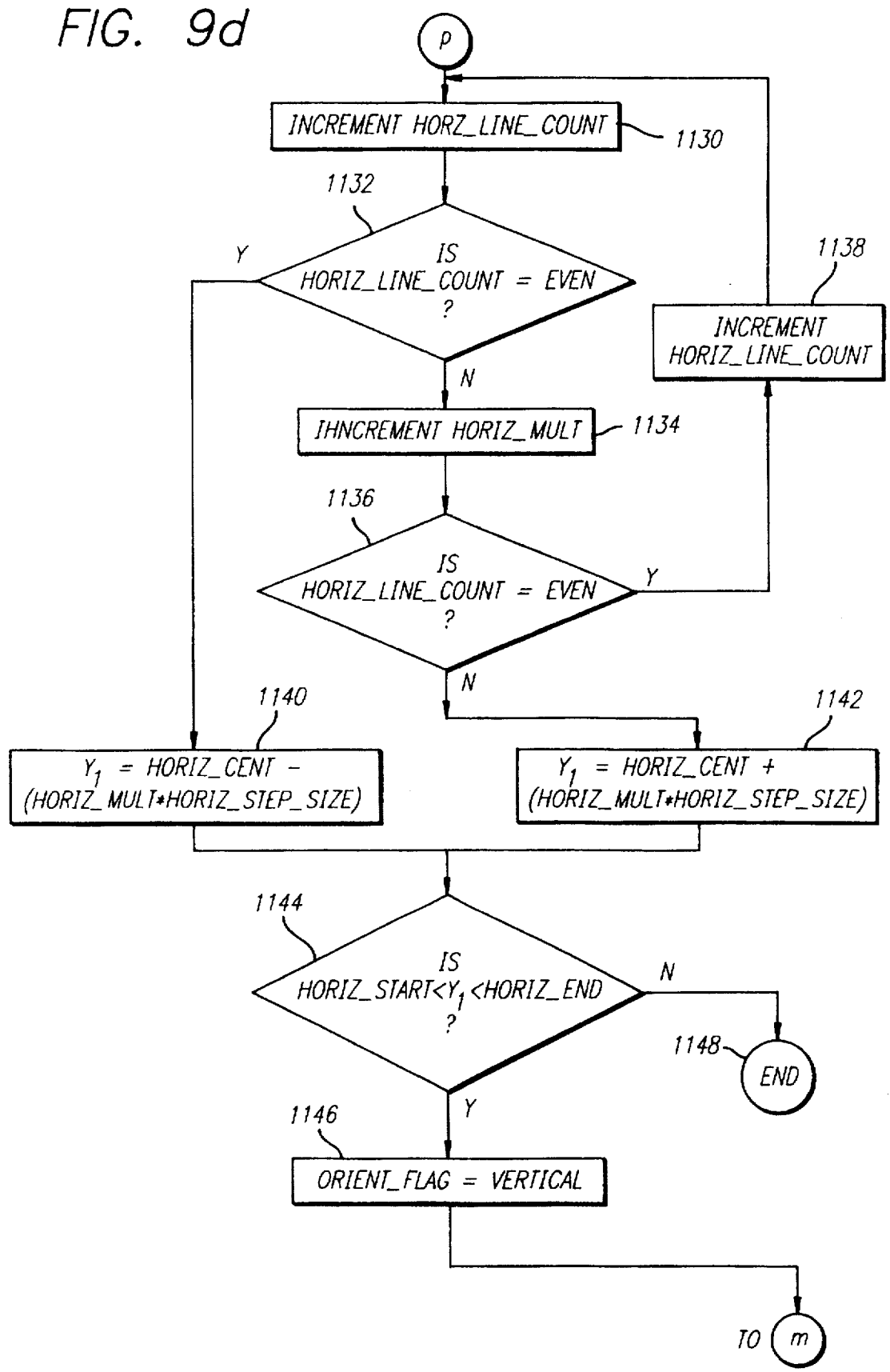
Figure 9E:
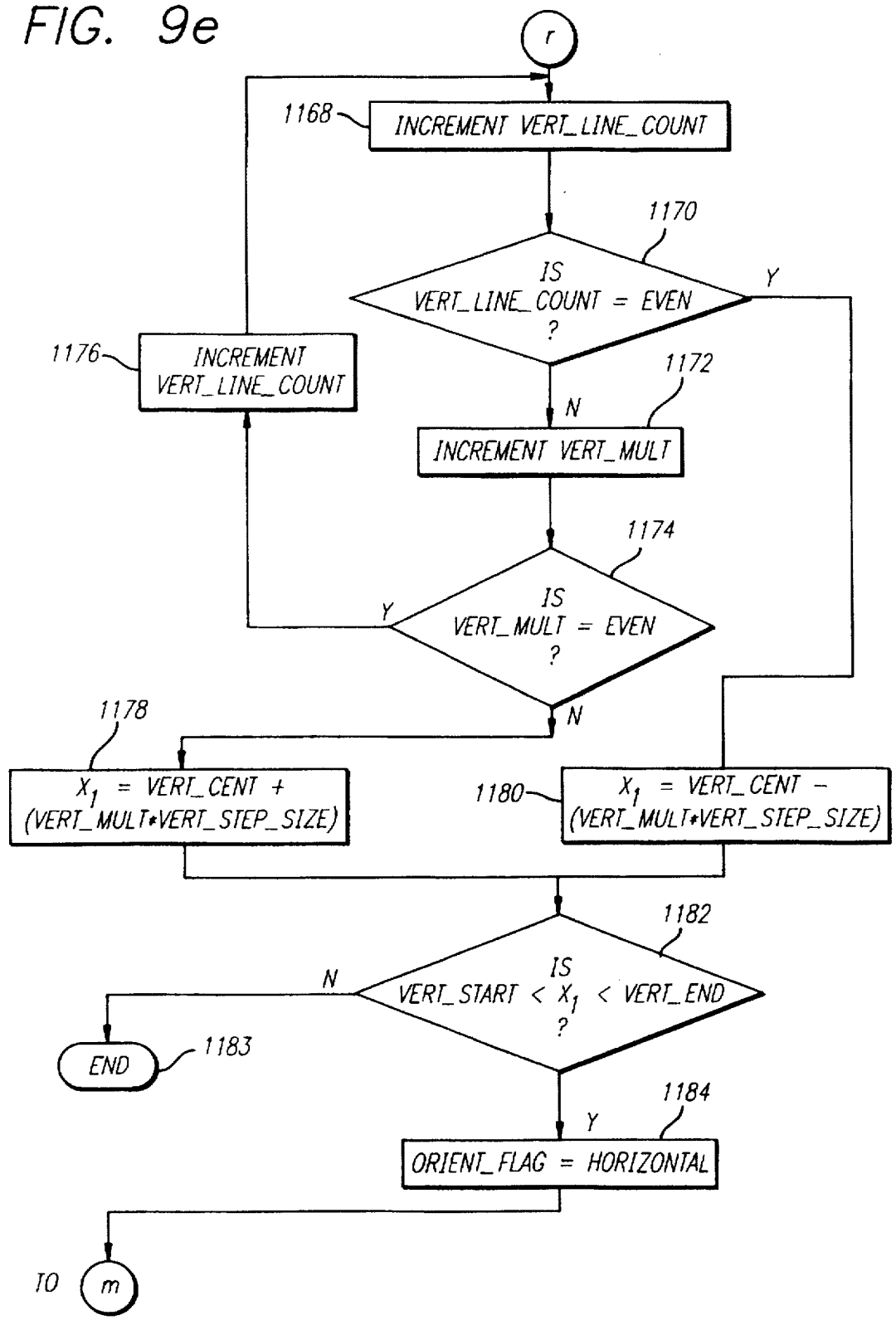

An exemplary search pattern generated by the first alternative embodiment of the symbol locator block is shown in FIGS. 8a–8l. The search area shown in FIGS. 8a–8l is bounded by a horizontal start boundary (HORIZ_START) 1002, a horizontal end boundary (HORIZ_END) 1004, a vertical start boundary (VERT_START) 1001, and a vertical end boundary (VERT_END) 1003. Because the orientation flag (ORIENT_FLAG) is initially set equal to "vertical" at step 408, the process illustrated in FIGS. 7a–7d scans an initial vertical line 1006/1008, first in the forward direction 1006 and then in the reverse direction 1008 as illustrated in FIGS. 8a–b. An initial horizontal line 1010/1012 is then scanned, first in the reverse direction 1010 and then in the forward direction 1012 as illustrated in FIGS. 8c–8d.

Subsequent vertical and horizontal lines 1014/1016, 1018/1020, 1022/1024, 1026/1028 are then scanned as shown in FIGS. 8e–8l. Each subsequent vertical line 1018/1020, 1026/1028 is located an odd multiple of vertical step sizes either to the right or to the left of the initial vertical line 1006/1008. Likewise, each subsequent horizontal line 1018/1020, 1026/1028 is located an odd multiple of horizontal step sizes either above or below the initial horizontal line 1010/1012.

In the exemplary pattern shown in FIGS. 8a–8l, the horizontal step size (HORIZ_STEP_SIZE) is reduced to a value that is less than the minimum horizontal step size (HORIZ_MIN_STEP) after line 1026/1028 is scanned, which causes the symbol locator block 104 to terminate processing at step 906. However, if the reduced value of the horizontal step size was not less than the minimum horizontal step size after line 1026/1028 was scanned, a series of additional vertical lines would be scanned, and those additional vertical lines would be located an odd multiple of the reduced vertical step size to the right or left of the initial vertical line 1006/1008. Likewise, a series of additional horizontal lines would be scanned, and those additional horizontal lines would be located an odd multiple of a reduced horizontal step size above or below the initial horizontal line 1010/1012.

4. Second Alternative Embodiment of the Symbol Locator Block

Operation of a second alternative embodiment of the symbol locator block 104 will now be described with reference to FIGS. 9a–9e. Operation of the second alternative embodiment of the symbol locator block 104 begins with an initialization process that is similar to the initialization process of the preferred embodiment as described above with the following exceptions. The second alternative embodiment receives a horizontal step size (HORIZ_STEP_SIZE) and a vertical step size (VERT_STEP_SIZE) at step 1102, rather than calculating those parameters. Also, the second alternative embodiment does not receive minimum step size parameters. In addition, the second alternative embodiment initially sets the orientation flag (ORIENT_FLAG) equal to "vertical" at step 1106.

After completing the above described initialization process, the second alternative embodiment scans a series of horizontal and vertical lines. Like the preferred embodiment, the second alterative embodiment changes the next horizontal line value ($Y_1$) after scanning a horizontal line, and changes the next vertical line value ($X_1$) after scanning a vertical line. Unlike the preferred embodiment, however, the second preferred embodiment simply stops processing at step 1148 if it is determined at step 1144 that the next horizontal line value ($Y_1$) is less than or equal to the horizontal start boundary (HORIZ_START) 304 or greater than or equal to the horizontal end boundary (HORIZ_END) 308. Likewise, the second preferred embodiment stops processing at step 1183 if it is determined at step 1182 that the next vertical line value ($X_1$) is less than or equal to the vertical start boundary (VERT_START) 306 or greater than or equal to the vertical end boundary (VERT_END) 310.

Figure 10A:
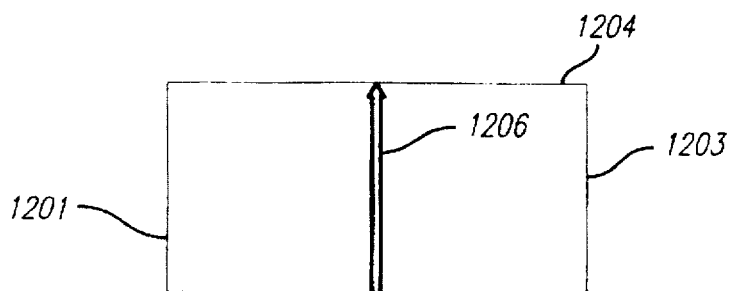
FIGS. 10a–10f illustrate an exemplary search pattern generated by operation of the second alternative embodiment of the symbol locator block.
Figure 10B:
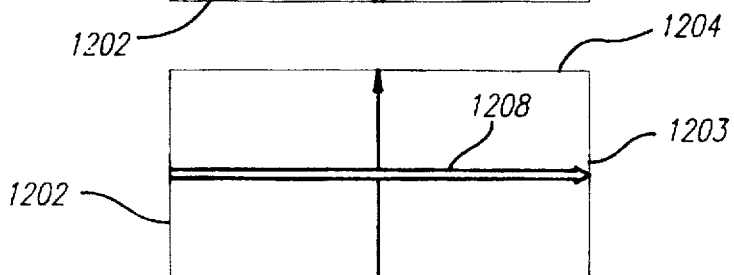
Figure 10C:
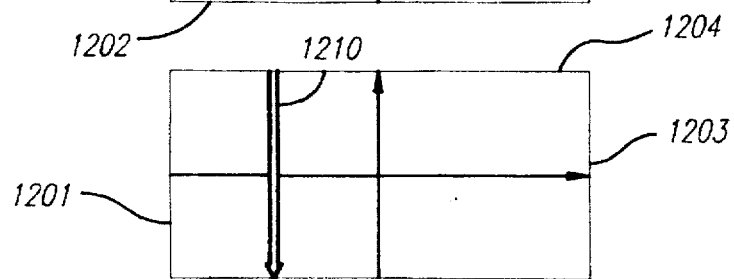
Figure 10D:
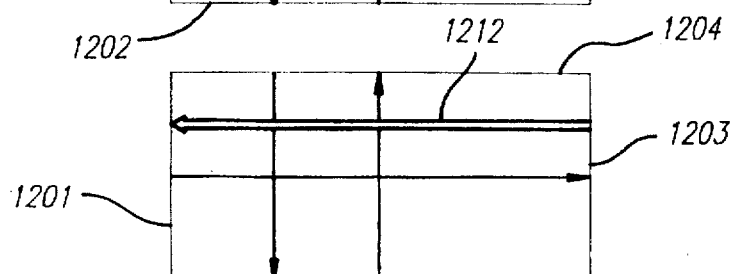
Figure 10E:
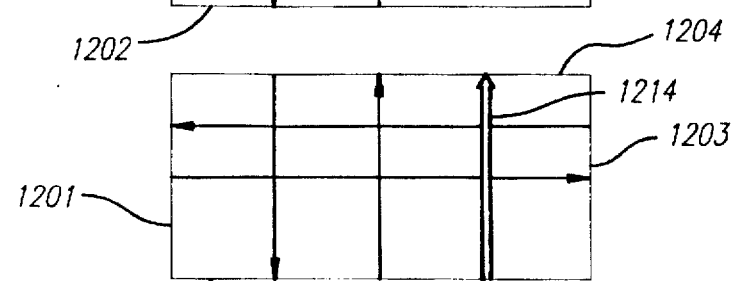
Figure 10F:
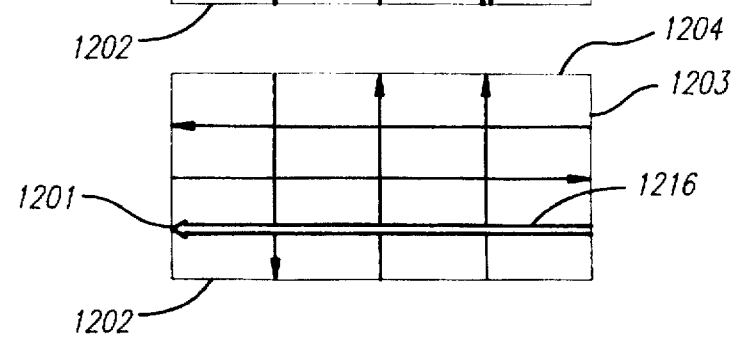
Figure 11A:
FIGS. 11a–11i illustrate exemplary coded symbols.
Figure 11B:
Figure 11C:
Figure 11D:
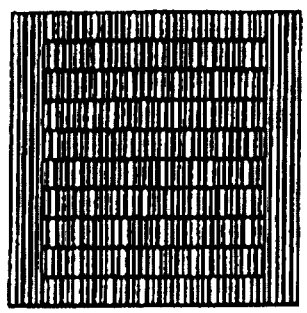
Figure 11E:
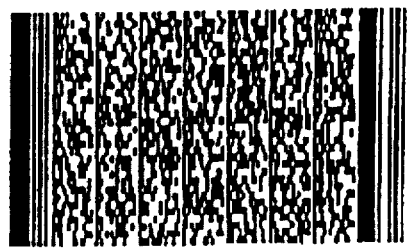
Figure 11F:
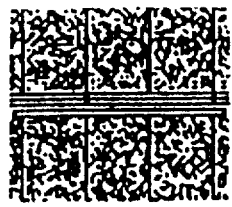
Figure 11G:
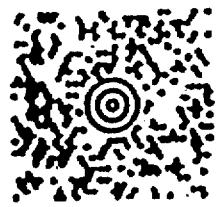
Figure 11H:
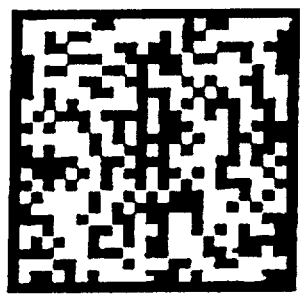
Figure 11I:
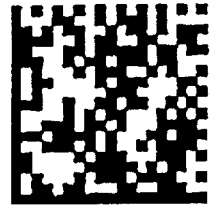

An exemplary search pattern generated by the second alternative embodiment of the symbol locator block is shown in FIGS. 10a–10f. The search area shown in FIGS. 10a–10f is bounded by a horizontal start boundary (HORIZ_START) 1202, a horizontal end boundary (HORIZ_END) 1204, a vertical start boundary (VERT_START) 1201, and a vertical end boundary (VERT END) 1203. Because the orientation flag (ORIENT_FLAG) is initially set equal to "vertical" and the vertical direction flag (VERT_DIR_FLAG) is initially set equal to "forward" at step 1106, the process illustrated in FIGS. 9a–9e scans an initial vertical line 1206 in the forward direction as shown in FIG. 10a. An initial horizontal line 1208 is then scanned in the forward direction as shown in FIG. 10b. Subsequent horizontal and vertical lines 1210, 1212, 1214, 1216 are then scanned as shown in FIGS. 10c–10f. Each subsequent horizontal line 1212, 1216 is located an odd multiple of horizontal line step sizes either above or below the initial horizontal line 1208. Also, the direction in which each subsequent horizontal line 1212, 1216 is scanned is alternated between forward and reverse. Likewise, each subsequent vertical line 1210, 1214 is located an odd multiple of vertical step sizes either to the right or left of the initial vertical line 1206, and the direction in which each subsequent vertical line 1210, 1214 is scanned is alternated between forward and reverse. Once it is determined that a subsequent horizontal line would be located on or outside a horizontal boundary 1202, 1204 at step 1144 or that a subsequent vertical line would be located on or outside a vertical boundary 1201, 1203 at step 1182, processing ends at step 1148 or 1183.

5. Conclusion

Having thus described several embodiments of the invention, it should be apparent to those skilled in the art that certain advantages have been achieved. It should also be appreciated that various modifications, adaptations, and alternative embodiments thereof may be made within the scope and spirit of the present invention. For example, the orientation flag (ORIENT_FLAG) could initially be set to either "horizontal" or "vertical" in any of the above described embodiments. Likewise, any of the direction flags could initially be set to either "forward" or "reverse." Moreover, the multiple targets flag could be set to "true" in any of the above embodiments, causing the symbol locator block to search for multiple symbols within the search area. In addition, the scan direction of horizontal lines and vertical lines need not be alternated between forward and reverse.

Also, although the "scan a line" routine and the "pixel pattern matching" subroutine were described above as searching for a predetermined target pixel pattern, other methods of analyzing pixels while scanning a line of pixels stored in the image memory could alternatively be used to determine whether a scanned line of pixels crosses a desired coded symbol. Such methods include pattern analysis techniques. Typically, pattern analysis techniques involve extracting a particular feature, such as an edge or a line segment, from a scanned line of pixels and analyzing the extracted feature to determined whether it is characteristic of the coded symbol being searched for. Numerous pattern analysis techniques suitable for use with the present invention are well known in the computer vision and machine vision fields.

In addition, although the distinguishing characteristic of a pixel illustrated in the above embodiments is whether the pixel is dark or light, other distinguishing characteristics of a pixel could alternatively be used. The invention is limited only by the following claims.

What is claimed is:

1. A method of searching for a predetermined symbol within a predefined search area of a digitized image comprising the steps of:

(a) scanning a first initial line of said digitized image located within said predefined search area, said first initial line passing through a first scan point located along a first boundary of said predefined search area;

(b) changing a location of said first scan point such that a first subsequent line of said digitized image that is parallel to said first initial line and passes through said changed first scan point is located a distance equal to a product of a first multiplier and a first step size away from said first initial line in a first scan point change direction;

(c) scanning said first subsequent line of said digitized image;

(d) increasing a size of said first multiplier; and (e) determining whether to end said search for said predetermined symbol.

2. The method of claim 1 further comprising the step of:

repeating said steps (b)–(e) until it is determined at said determining step to end said search for said predetermined symbol.

3. The method of claim 2, wherein said determining step further comprises the step of:

determining to end said search for said predetermined symbol if one of said first initial line and said first subsequent line crosses at least a portion of said predetermined symbol.

4. The method of claim 2, wherein said determining step further comprises the step of:

determining to end said search for said predetermined symbol if said first subsequent line of said digitized image does not pass through at least a portion of said predefined search area.

5. A method of searching for a predetermined symbol within a predefined search area of a digitized image comprising the steps of:
  (a) scanning a first initial line of said digitized image located within said predefined search area, said first initial line passing through a first scan point located along a first boundary of said predefined search area;
  (b) changing a location of said first scan point such that a first subsequent line of said digitized image that is parallel to said first initial line and passes through said changed first scan point is located a distance equal to a product of a first multiplier and a first step size away from said first initial line in a first scan point change direction;
  (c) scanning said first subsequent line of said digitized image;
  (d) increasing a size of said first multiplier;
  (e) determining whether to end said search for said predetermined symbol, said determining step comprising the steps of reducing said first step size and resetting said first multiplier if said first subsequent line does not pass through at least a portion of said predefined search area, and determining to end said search for said predetermined symbol if said first step size is less than a minimum first step size; and
  (f) repeating said steps (b)–(e) until it is determined at said determining step to end said search for said predetermined symbol.

6. The method of claim 1 further comprising the steps of:
  (f) changing said location of said first scan point again such that a first additional subsequent line of said digitized image that is parallel to said first initial line and passes through said again changed first scan point is located a distance equal to a product of said first multiplier and said first step size away from said first initial line in a direction that is opposite to said first scan point change direction; and
  (g) scanning said first additional subsequent line of said digitized image.

7. The method of claim 6 further comprising the step of:
  repeating said steps (b)–(g) until it is determined at said step (e) to end said search for said predetermined symbol.

8. The method of claim 6, wherein said step (c) further comprises the step of scanning said first subsequent line in a first scan direction; and said step (g) further comprises the step of scanning said first additional subsequent line in a direction that is opposite to said first scan direction.

9. A method of searching for a predetermined symbol within a predefined search area of a digitized image comprising the steps of:
  (a) scanning a first initial line of said digitized image located within said predefined search area, said first initial line passing through a first scan point located along a first boundary of said predefined search area;
  (b) changing a location of said first scan point such that a first subsequent line of said digitized image that is parallel to said first initial line and passes through said changed first scan point is located a distance equal to a product of a first multiplier and a first step size away from said first initial line in a first scan point change direction;
  (c) scanning said first subsequent line of said digitized image;
  (d) increasing a size of said first multiplier;
  (e) scanning a second initial line of said digitized image located within said predefined search area, said second initial line passing through a second scan point located along a second boundary of said predefined search area;
  (f) changing a location of said second scan point such that a second subsequent line of said digitized image that is parallel to said second initial line and passes through said changed second scan point is located a distance equal to a product of a second multiplier and a second step size away from said second initial line in a second scan point change direction;
  (g) scanning said second subsequent line of said digitized image;
  (h) increasing a size of said second multiplier; and
  (i) determining whether to end said search for said predetermined symbol.

10. A method of searching for a predetermined symbol within a predefined search area of a digitized image comprising the steps of:
  (a) scanning a first initial line of said digitized image located within said predefined search area, said first initial line passing through a first scan point located along a first boundary of said predefined search area;
  (b) changing a location of said first scan point such that a first subsequent line of said digitized image that is parallel to said first initial line and passes through said changed first scan point is located a distance equal to a product of a first multiplier and a first step size away from said first initial line in a first scan point change direction;
  (c) scanning said first subsequent line of said digitized image;
  (d) increasing a size of said first multiplier;
  (e) determining whether to end said search for said predetermined symbol;
  (f) scanning a second initial line of said digitized image located within said predefined search area, said second initial line passing through a second scan point located along a second boundary of said predefined search area;
  (g) changing a location of said second scan point such that a second subsequent line of said digitized image that is parallel to said second initial line and passes through said changed second scan point is located a distance equal to a product of a second multiplier and a second step size away from said second initial line in a second scan point change direction;
  (h) scanning said second subsequent line of said digitized image;
  (i) increasing a size of said second multiplier; and
  (j) repeating said steps (b)–(e) and (g)–(i) until it is determined at said step (e) to end said search for said predetermined symbol.

11. A method of searching for a predetermined symbol within a predefined search area of a digitized image comprising the steps of:
  (a) scanning a first initial line of said digitized image located within said predefined search area, said first initial line passing through a first scan point located along a first boundary of said predefined search area;
  (b) changing a location of said first scan point such that a first subsequent line of said digitized image that is parallel to said first initial line and passes through said changed first scan point is located a distance equal to a product of a first multiplier and a first step size away from said first initial line in a first scan point change direction;

(c) scanning said first subsequent line of said digitized image;

(d) increasing a size of said first multiplier;

(e) changing said location of said first scan point again such that a first additional subsequent line of said digitized image that is parallel to said first initial line and passes through said again changed first scan point is located a distance equal to a product of said first multiplier and said first step size away from said first initial line in a direction that is opposite to said first scan point change direction;

(f) scanning said first additional subsequent line of said digitized image;

(g) scanning a second initial line of said digitized image located within said predefined search area, said second initial line passing through a second scan point located along a second boundary of said predefined search area;

(h) changing said location of said second scan point such that a second subsequent line of said digitized image that is parallel to said second initial line and passes through said changed second scan point is located a distance equal to a product of a second multiplier and a second step size away from said second initial line in a second scan point change direction;

(i) scanning said second subsequent line of said digitized image;

(j) changing said location of said second scan point again such that a second additional subsequent line of said digitized image that is parallel to said second initial line and passes through said again changed second scan point is located a distance equal to a product of said second multiplier and said second step size away from said initial line in a direction that is opposite to said second scan point change direction;

(k) scanning said second additional subsequent line of said digitized image;

(l) increasing a size of said second multiplier; and (m) determining whether to end said search for said predetermined symbol.

12. A method of searching for a predetermined symbol within a predefined search area of a digitized image comprising the steps of:

(a) scanning a first initial line of said digitized image located within said predefined search area, said first initial line passing through a first scan point located alone a first boundary of said Redefined search area;

(b) changing a location of said first scan point such that a first subsequent line of said digitized image that is parallel to said first initial line and passes through said changed first scan point is located a distance equal to a product of a first multiplier and a first step size away from said first initial line in a first scan point change direction;

(c) scanning said first subsequent line of said digitized image;

(d) increasing a size of said first multiplier;

(e) determining whether to end said search for said predetermined symbol;

(f) changing said location of said first scan point again such that a first additional subsequent line of said digitized image that is parallel to said first initial line and passes through said again changed first scan point is located a distance equal to a product of said first multiplier and said first step size away from said first initial line in a direction that is opposite to said first scan point change direction;

(g) scanning said first additional subsequent line of said digitized image;

(h) scanning a second initial line of said digitized image located within said predefined search area, said second initial line passing through a second scan point located along a second boundary of said predefined search area;

(i) changing said location of said second scan point such that a second subsequent line of said digitized image that is parallel to said second initial line and passes through said changed second scan point is located a distance equal to a product of a second multiplier and a second step size away from said second initial line in a second scan point change direction;

(j) scanning said second subsequent line of said digitized image;

(k) changing said location of said second scan point again such that a second additional subsequent line of said digitized image that is parallel to said second initial line and passes through said again changed second scan point is located a distance equal to a product of said second multiplier and said second step size away from said initial line in a direction that is opposite to said second scan point change direction;

(l) scanning said second additional subsequent line of said digitized image;

(m) increasing a size of said second multiplier; and (n) repeating said steps (b)–(g) and (i)–(m) until it is determined at said step (e) to end said search for said predetermined symbol.

13. The method of claim 1, wherein said predetermined symbol is a coded symbol.

14. An article of manufacture comprising a machine readable media embodying instructions for instructing said machine to perform the method of claim 1.

15. An article of manufacture comprising a machine readable media embodying instructions for instructing said machine to perform the method of claim 6.

16. An article of manufacture comprising a machine readable media embodying instructions for instructing said machine to perform a method of searching for a predetermined symbol within a predefined search area of a digitized image comprising the steps of:

(a) scanning a first initial line of said digitized image located within said predefined search area, said first initial line passing through a first scan point located along a first boundary of said predefined search area;

(b) changing a location of said first scan point such that a first subsequent line of said digitized image that is parallel to said first initial line and passes through said changed first scan point is located a distance equal to a product of a first multiplier and a first step size away from said first initial line in a first scan point change direction;

(c) scanning said first subsequent line of said digitized image;

(d) increasing a size of said first multiplier;

(e) determining whether to end said search for said predetermined symbol;

(f) changing said location of said first scan point again such that a first additional subsequent line of said digitized image that is parallel to said first initial line and passes through said again changed first scan point is located a distance equal to a product of said first multiplier and said first step size away from said first initial line in a direction that is opposite to said first scan point change direction;

(g) scanning said first additional subsequent line of said digitized image;

(h) scanning a second initial line of said digitized image located within said predefined search area, said second initial line passing through a second scan point located along a second boundary of said predefined search area;

(i) changing said location of said second scan point such that a second subsequent line of said digitized image that is parallel to said second initial line and passes through said changed second scan point is located a distance equal to a product of a second multiplier and a second step size away from said second initial line in a second scan point change direction;

(j) scanning said second subsequent line of said digitized image;

(k) changing said location of said second scan point again such that a second additional subsequent line of said digitized image that is parallel to said second initial line and passes through said again changed second scan point is located a distance equal to a product of said second multiplier and said second step size away from said initial line in a direction that is opposite to said second scan point change direction;

(l) scanning said second additional subsequent line of said digitized image; and (m) increasing a size of said second multiplier.

17. An apparatus for searching for a predetermined symbol within a predefined search area of a digitized image comprising:

a memory device in which said digitized image is stored;

means for setting a location of a first scan point equal to a first reference point located along a first boundary of said predefined search area;

first changing means for changing said location of said first scan point such that a line of said digitized image that is perpendicular to said first boundary and passes through said first scan point is located, in a first scan point change direction, a distance equal to a product of a first multiplier and a first step size away from a line that is perpendicular to said first boundary and passes through said first reference point;

means for scanning a line of said digitized image that is located within said predefined search area and passes through said first scan point;

means for increasing a size of said first multiplier; and means for determining whether to end said search for said predetermined symbol.

18. The apparatus of claim 17 further comprising:

second changing means for changing said location of said first scan point such that a line that is perpendicular to said first boundary and passes through said first scan point is located, in a direction opposite to said first scan point change direction, a distance equal to said product of said first multiplier and said first step size away from said line that is perpendicular to said first boundary and passes through said first reference point.

19. The apparatus of claim 18, wherein said scanning means further includes:

means for scanning said line of said digitized image in a direction indicated by a scan direction indicator; and means for changing said direction indicated by said scan direction indictor.

20. An apparatus for searching for a predetermined symbol within a predefined search area of a digitized image comprising:

a memory device in which said digitized image is stored;

means for setting a location of a first scan point equal to a first reference point located along a first boundary of said predefined search area;

first changing means for changing said location of said first scan point such that a line of said digitized image that is perpendicular to said first boundary and passes through said first scan point is located, in a first scan point change direction, a distance equal to a product of a first multiplier and a first step size away from a line that is perpendicular to said first boundary and passes through said first reference point;

means for scanning a line of said digitized image that is located within said predefined search area and passes through said first scan point;

means for increasing a size of said first multiplier;

means for setting a location of a second scan point equal to a second reference point located along a second boundary of said predefined search area;

second changing means for changing said location of said second scan point such that a line that is perpendicular to said second boundary and passes through said second scan point is located, in a second scan point change direction, a distance equal to a product of a second multiplier and a second step size away from a line that is perpendicular to said second boundary and passes through said second reference point;

means for scanning a line of said digitized image that is located within said predefined search area, is perpendicular to said second boundary, and passes through said second scan point;

means for increasing a size of said second multiplier; and means for determining whether to end said search for said predetermined symbol.

21. An apparatus for searching for a predetermined symbol within a predefined search area of a digitized image comprising:

a memory device in which said digitized image is stored;

means for setting a location of a first scan point equal to a first reference point located along a first boundary of said predefined search area;

first changing means for changing said location of said first scan point such that a line of said digitized image that is perpendicular to said first boundary and passes through said first scan point is located, in a first scan point change direction, a distance equal to a product of a first multiplier and a first step size away from a line that is perpendicular to said first boundary and passes through said first reference point;

means for scanning a line of said digitized image that is located within said predefined search area and passes through said first scan point;

means for increasing a size of said first multiplier;

means for setting a location of a second scan point equal to a second reference point located along a second boundary of said predefined search area;

second chancing means for changing said location of said second scan point such that a line that is perpendicular to said second boundary and passes through said second scan point is located, in a second scan point change direction, a distance equal to a product of a second multiplier and a second step size away from a line that is perpendicular to said second boundary and passes through said second reference point;

means for scanning a line of said digitized image that is located within said predefined search area, is perpendicular to said second boundary, and passes through said second scan point;

means for increasing a size of said second multiplier;

means for determining whether to end said search for said predetermined symbol;

third changing means for changing said location of said first scan point such that a line that is perpendicular to said first boundary and passes through said first scan point is located, in a direction opposite to said first scan point change direction, a distance equal to said product of said first multiplier and said first step size away from said line that is perpendicular to said first boundary and passes through said first reference point; and fourth changing means for further changing said location of said second scan point such that a line that is perpendicular to said second boundary and passes through said second scan point is located, in a direction opposite to said second scan point change direction, a distance equal to said product of said second multiplier and said second step size away from said line that is perpendicular to said second boundary and passes through said second reference point.

22. The apparatus of claim 17, wherein said determining means further comprises:

means for determining to end said search for said predetermined symbol if said line that is perpendicular to said first boundary and passes through said first scan point does not pass through at least a portion of said predefined search area.

23. The apparatus of claim 17, wherein said determining means further comprises:

means for determining to end said search for said predetermined symbol if said line of said digitized image scanned by said scanning means crosses at least a portion of said predetermined symbol.

24. The apparatus of claim 17, wherein said determining means further comprises:

means for reducing said first step size and resetting said first multiplier if said line that is perpendicular to said first boundary and passes through said first scan point does not pass through said predefined search area; and means for determining to end said search for said predetermined symbol if said first step size is less than a minimum first step size.

25. The apparatus of claim 17, wherein said predetermined symbol is a coded symbol.

26. A method of searching for a plurality of symbols within a digitized image comprising the steps of:

(a) initializing a step size to a value greater than one, said value calculated to minimize the number of steps needed to locate said plurality of symbols;

(a) scanning an initial line of said digitized image;

(b) calculating a subsequent line of said digitized image, said subsequent line parallel to said initial line and located a distance equal to a product of said step size and a multiplier away from said initial line;

(c) scanning said subsequent line;

(d) increasing the value of said multiplier; and (e) determining whether to end said search for said plurality of symbols.

27. The method of claim 26 wherein the calculating step further includes determining whether said subsequent line is outside of said digitized image, and if so, resetting said multiplier, reducing said step size and recalculating said subsequent line.

28. An apparatus for searching for a plurality of symbols within a digitized image comprising:

an image memory in which said digitized image is stored; and a processor and a program memory storing instructions to be performed by said processor, said instructions including:

initializing a step size such that said plurality of symbols will be located with a minimal number of scans, defining an initial line of said digitized image, defining a scan line a distance equal to a product of a multiplier and a step size away from said initial line, scanning said scan line, increasing the size of said multiplier, and determining whether to end said search for said plurality of symbols.

29. The apparatus of claim 28 wherein said instructions further include determining whether said subsequent line is outside of said digitized image, and if so, resetting said multiplier, reducing said step size and recalculating said subsequent line.

* * * * *